United States Patent
Miura et al.

(10) Patent No.: US 9,049,326 B2
(45) Date of Patent: Jun. 2, 2015

(54) MULTIFUNCTION DEVICE WITH SCANNER UNIT OFFSET FROM RECORDING SHEET TRAY

(75) Inventors: Katsuro Miura, Aichi (JP); Yuji Koga, Aichi (JP); Isao Kubo, Aichi (JP); Yasunari Yoshida, Aichi (JP); Jiro Yamamoto, Aichi (JP); Masayuki Takata, Aichi (JP); Takashi Ohama, Aichi (JP); Yoshinori Osakabe, Aichi (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 233 days.

(21) Appl. No.: 13/606,128

(22) Filed: Sep. 7, 2012

(65) Prior Publication Data

US 2013/0063751 A1 Mar. 14, 2013

(30) Foreign Application Priority Data

Sep. 9, 2011 (JP) ................................. 2011-196751
Sep. 9, 2011 (JP) ................................. 2011-197178

(51) Int. Cl.
*B41J 13/10* (2006.01)
*B65H 31/02* (2006.01)
(Continued)

(52) U.S. Cl.
CPC ....... *H04N 1/00527* (2013.01); *H04N 1/00525* (2013.01); *G03G 2215/00236* (2013.01);
(Continued)

(58) Field of Classification Search
CPC ............ H04N 1/00621; H04N 1/0066; H04N 1/00527; H04N 1/0053; G03G 15/6552; G03G 21/1609; G03G 2215/00236; G03G 2215/00421; B41J 13/0072; B41J 13/106; H01H 1/00525

USPC ............ 399/363, 405; 400/693; 358/296, 300
See application file for complete search history.

(56) References Cited

U.S. PATENT DOCUMENTS 4,921,239 A * 5/1990 Okui et al. .................... 271/186
7,660,548 B2 2/2010 Muraki et al.
(Continued)

FOREIGN PATENT DOCUMENTS

| JP | 61-064640 A | 4/1986 |
| JP | 61-290434 A | 12/1986 |

(Continued)

OTHER PUBLICATIONS

Sep. 25, 2014—(US) Non-Final Office Action—U.S. Appl. No. 13/606,097.

(Continued)

*Primary Examiner* — Daniel J Colilla
(74) *Attorney, Agent, or Firm* — Banner & Witcoff, Ltd.

(57) ABSTRACT

A multifunction device including an image recording unit and a scanner unit is provided. The scanner unit includes an image readable plane. The image recording unit includes a first tray, a conveyer path to convey the recording sheet in a first orientation, and a second tray, which is formed along an edge of an opening formed on the front face, and in which the recording sheet having been conveyed in the conveyer path is disposed. The recording sheet in a maximum conveyable size for the conveyer path is disposed to occupy a discharge area in the second tray. A downstream end of the discharge area along a second orientation is in a displaced and downstream position with respect to a downstream end of an image readable area of the image readable plane along the second orientation for a first distance.

11 Claims, 16 Drawing Sheets

(51) Int. Cl.
  *H04N 1/00* (2006.01)
  *G03G 15/00* (2006.01)
  *B41J 13/00* (2006.01)
  *H04N 1/10* (2006.01)
  *H04N 1/12* (2006.01)

(52) U.S. Cl.
  CPC ... *H04N1/0066* (2013.01); *G03G 2215/00421* (2013.01); *G03G 15/6552* (2013.01); *B65H 31/02* (2013.01); *B41J 13/106* (2013.01); *B41J 13/0072* (2013.01); *H04N 1/0053* (2013.01); *H04N 1/00535* (2013.01); *H04N 1/00588* (2013.01); *H04N 1/00591* (2013.01); *H04N 1/00602* (2013.01); *H04N 1/0062* (2013.01); *H04N 1/00631* (2013.01); *H04N 1/1017* (2013.01); *H04N 1/1026* (2013.01); *H04N 1/1235* (2013.01); *H04N 2201/0094* (2013.01)

(56) References Cited

U.S. PATENT DOCUMENTS

| 7,808,683 | B2* | 10/2010 | Muraki et al. | 358/498 |
| 2006/0018693 | A1* | 1/2006 | Nobe et al. | 399/405 |
| 2007/0127962 | A1 | 6/2007 | Fukumura | |
| 2007/0228644 | A1 | 10/2007 | Muraki et al. | |
| 2009/0040572 | A1 | 2/2009 | Shimmachi et al. | |
| 2009/0201559 | A1* | 8/2009 | Yamada et al. | 358/474 |

FOREIGN PATENT DOCUMENTS

| JP | 62-111838 | A | | 5/1987 | | |
| JP | 05219308 | A | * | 8/1993 | | H04N 1/04 |
| JP | H06-002364 | U | | 1/1994 | | |
| JP | 08032767 | A | * | 2/1996 | | H04N 1/04 |
| JP | 2001-222202 | A | | 8/2001 | | |
| JP | 2004-009664 | A | | 1/2004 | | |
| JP | 2004133151 | A | * | 4/2004 | | G03B 27/50 |
| JP | 2007-074644 | A | | 3/2007 | | |
| JP | 2007-268864 | A | | 10/2007 | | |
| JP | 2009-044605 | A | | 2/2009 | | |
| JP | 2009-139971 | A | | 6/2009 | | |
| JP | 4612172 | B2 | | 1/2011 | | |

OTHER PUBLICATIONS

Feb. 17, 2015—(JP) Notification of Reasons for Rejection—App 2011-197178.

* cited by examiner

MULTIFUNCTION DEVICE WITH SCANNER UNIT OFFSET FROM RECORDING SHEET TRAY

CROSS REFERENCE TO RELATED APPLICATION

This application claims priority from Japanese Patent Applications No. 2011-197178, filed on Sep. 9, 2011, and No. 2011-196751, filed on Sep. 9, 2011, the entire subject matters of which are incorporated herein by reference.

BACKGROUND

1. Technical Field

An aspect of the present invention relates to a multifunction device (MFD), which has a recording function to record an image on a recording sheet and a reading function to read an image from an original sheet.

2. Related Art

An MFD having a reading (scanning) unit to read an image from an original sheet and an image recording (printing) unit to record the image on a recording sheet is widely known. Often, the image recording unit is arranged in a lower position in the MFD, and the scanner unit is arranged in an upper position in the MFD.

The image recording unit may have an extendable discharge tray, in which the recording sheet having the image recorded thereon is disposed. During an image recording operation, the discharge tray may be partially extended outward from a front face of the MFD. In other words, in a user's view, the recording sheet is ejected in a partially frontward position with respect to the front face of the MFD.

The MFD may further have a sheet placement plate in a top part in the scanner unit. In a lower position with respect to the sheet placement plate, an image sensor may be arranged. The image sensor optically may read the image from the original sheet, which is placed on the sheet placement plate.

The MFD in such configuration may function as a copier, in which the image read from the original sheet by the scanner unit is recorded on a recording sheet by the image recording unit.

SUMMARY

The user of the MFD may attempt to copy an image formed on a large original sheet, which is larger than a maximum readable size for one scanning behavior of the scanner unit. In such a case, the user may place a desired part of the large original sheet, which has the image to be read, on an image readable area of the sheet placement plate and start a copying operation. In this regard, another part of the large original sheet, which does not fit in the image reading area of the sheet placement plate, may hang down along the front face of the MFD. Meanwhile, the discharge tray may protrude frontward from the front face of the MFD. Therefore, the part of the large original sheet hanging down over the discharge tray may cover the recording sheet disposed in the discharge tray, and the recording sheet may be prevented from being seen by the user.

In particular, a compact-typed MFD may be formed to be smaller in depth and height and larger in width in view of storing efficiency. Therefore, the smaller-sized MFD may be often formed to have the discharge tray and the sheet placement plate to be arranged with a longitudinal direction thereof aligned with a crosswise direction of the MFD. When a desired original image to be copied is formed on one side of the original sheet with respect to a longitudinal center of the original sheet, the user may place the original sheet with a longitudinal edge thereof to align the direction of depth of the MFD. In this regard, the other side of the original sheet, which is opposite from the side having the image to be read, may hang down along the front face of the MFD. Whilst the smaller-sized MFD is often formed to have the extendable discharge tray on the front face thereof, the original sheet hanging down on the front face of the MFD may fall on the recording sheet disposed in the extended discharge tray. Further, due to the smaller height of the MFD, the original sheet hanging down along the front face may easily reach and cover the recording sheet in the discharge tray. Thus, the recording sheet may be easily prevented from being seen from the user. When the recording sheet is covered by the original sheet, the user may not notice an error in the recorded image when a print error occurs.

In view of the inconvenience, the present invention is advantageous in that a multifunction device, which can allow the user to observe a part of the image recorded on the recording sheet even when the image appearing on the original sheet larger than a maximum readable range for a scanner unit is read, is provided.

According to an aspect of the present invention, a multifunction device configured to read an image and record an image based the read image on a recording sheet is provided. The multifunction device includes an image recording unit configured to record the image on the recording sheet and a flatbed-typed scanner unit arranged in an upper position with respect to the image recording unit and configured to read the image from an original sheet. The scanner unit includes an image readable plane, on which the original sheet with the image to be read can be placed, and an original sheet cover, which is coupled to a rear side of the multifunction device at one end and is configured to be pivotable about the one end to one of expose and cover the image readable plane. The image recording unit includes a first tray, in which the recording sheet can be initially placed, a conveyer path configured to convey the recording sheet placed on the first tray upward from the rear side of the multifunction device, to invert the conveyed recording sheet, and to further convey the inverted recording sheet in a first orientation toward a front face of the multifunction device, and a second tray, which is at least partially extended from an opening formed on the front face of the multifunction device, and in which the recording sheet having been conveyed in the conveyer path is disposed. The recording sheet in a maximum conveyable size for the conveyer path is disposed to occupy a discharge area in the second tray. A downstream end of the discharge area along a second orientation, which is perpendicular to the first orientation in a horizontal plane view, is in a displaced and downstream position with respect to a downstream end of an image readable area of the image readable plane along the second orientation for a first distance.

BRIEF DESCRIPTION OF THE ACCOMPANYING DRAWINGS

Figure 7:
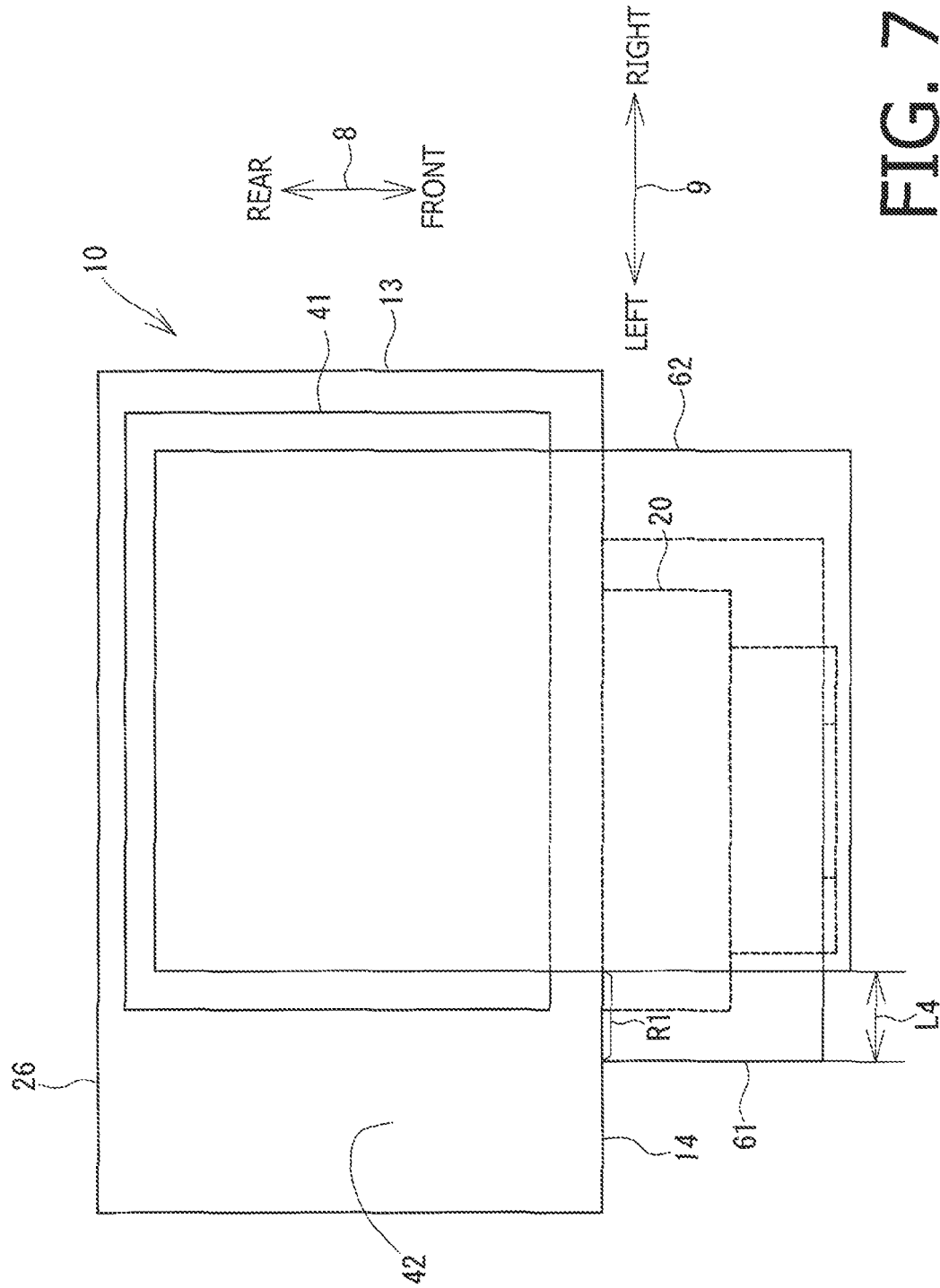

FIG. 7 is a plane view the MFD 10 according to the embodiment of the present invention with a recording sheet 61 having been through a copying operation and the larger-sized original sheet 62 placed partially on the contact glass 41 in the scanner unit.

Figure 8:
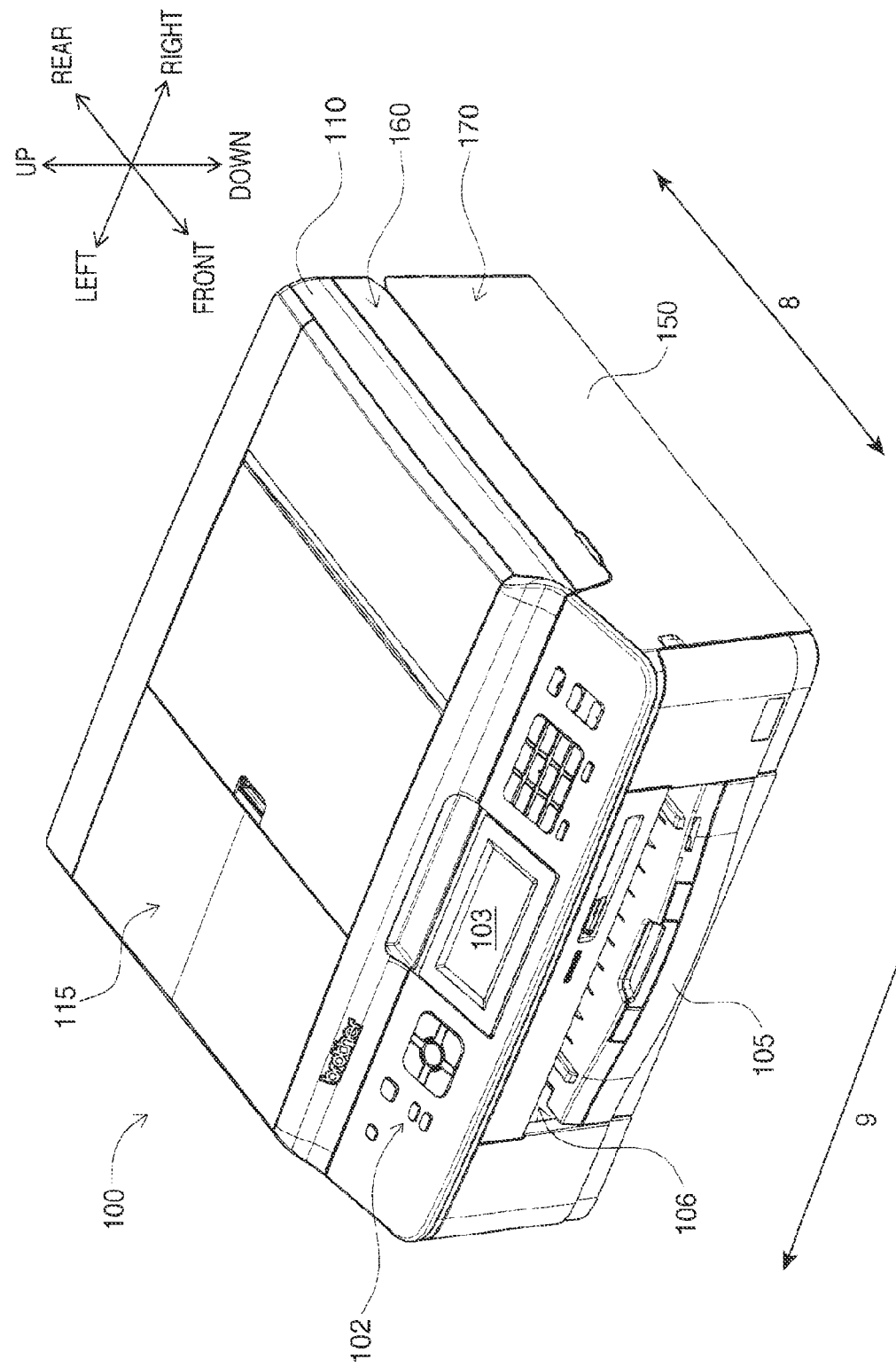

FIG. 8 is a perspective view of an MFD 110 according to a second embodiment of the present invention.

Figure 9:
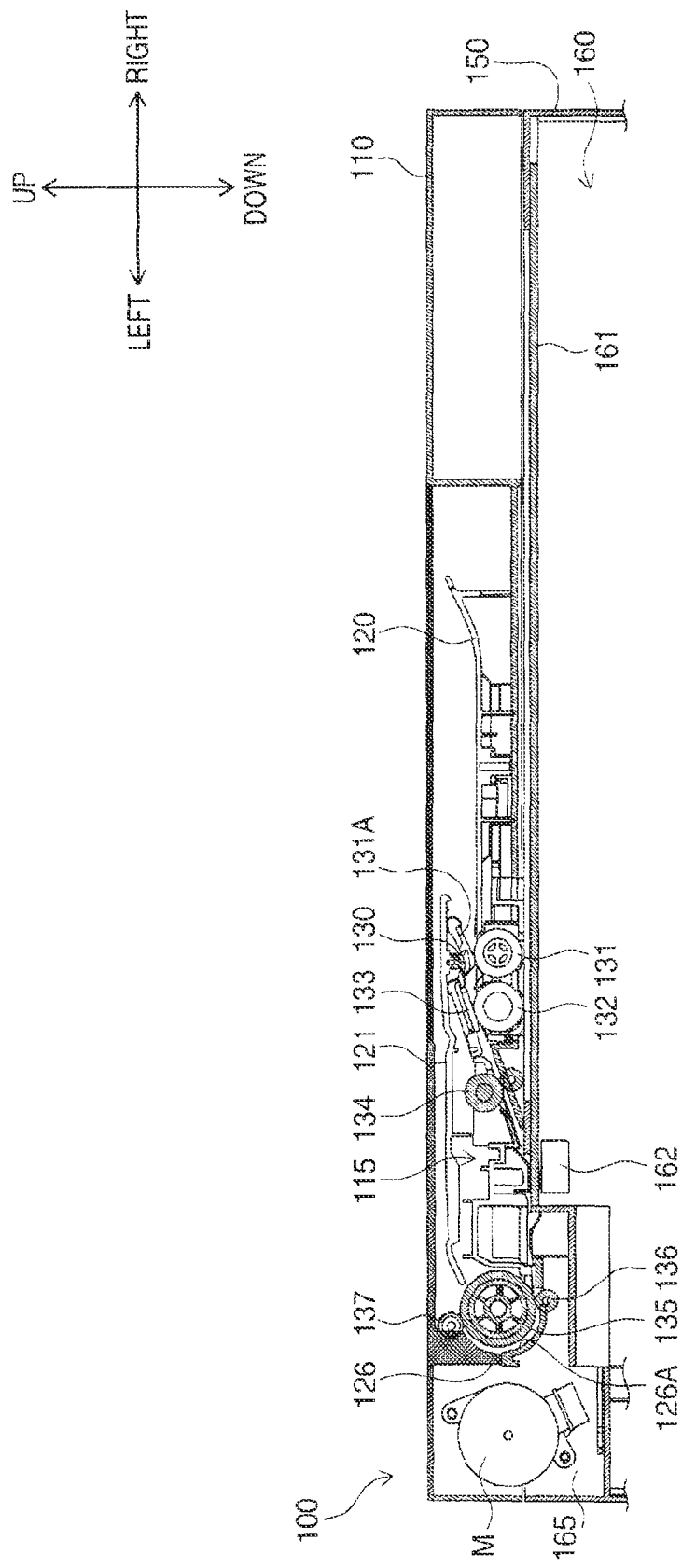

FIG. 9 is a cross-sectional front view of an upper cover and a scanner unit of the MFD 100 according to the second embodiment of the present invention.

Figure 10:
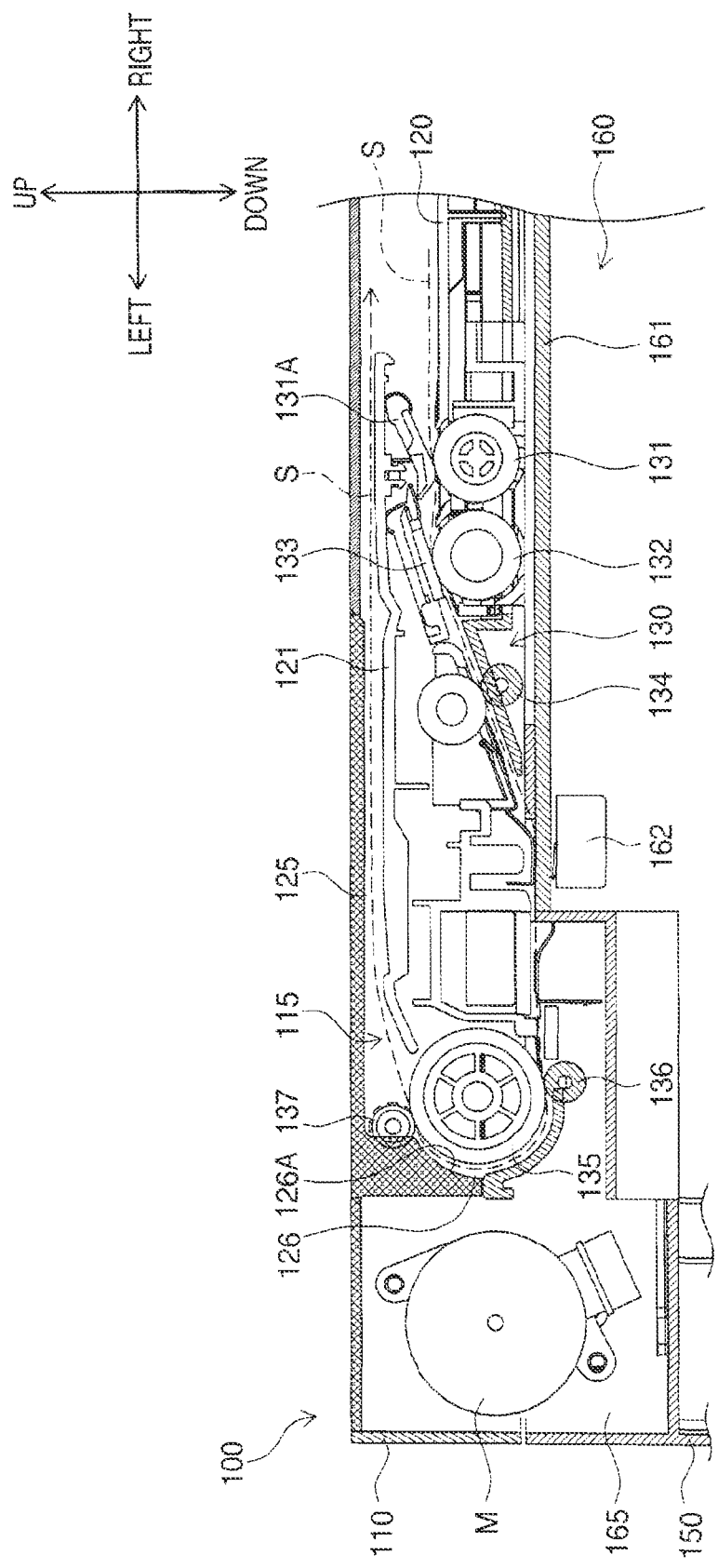

FIG. 10 is a cross-sectional front view of an ADF unit 115 provided in the upper cover according to the second embodiment of the present invention.

Figure 11:
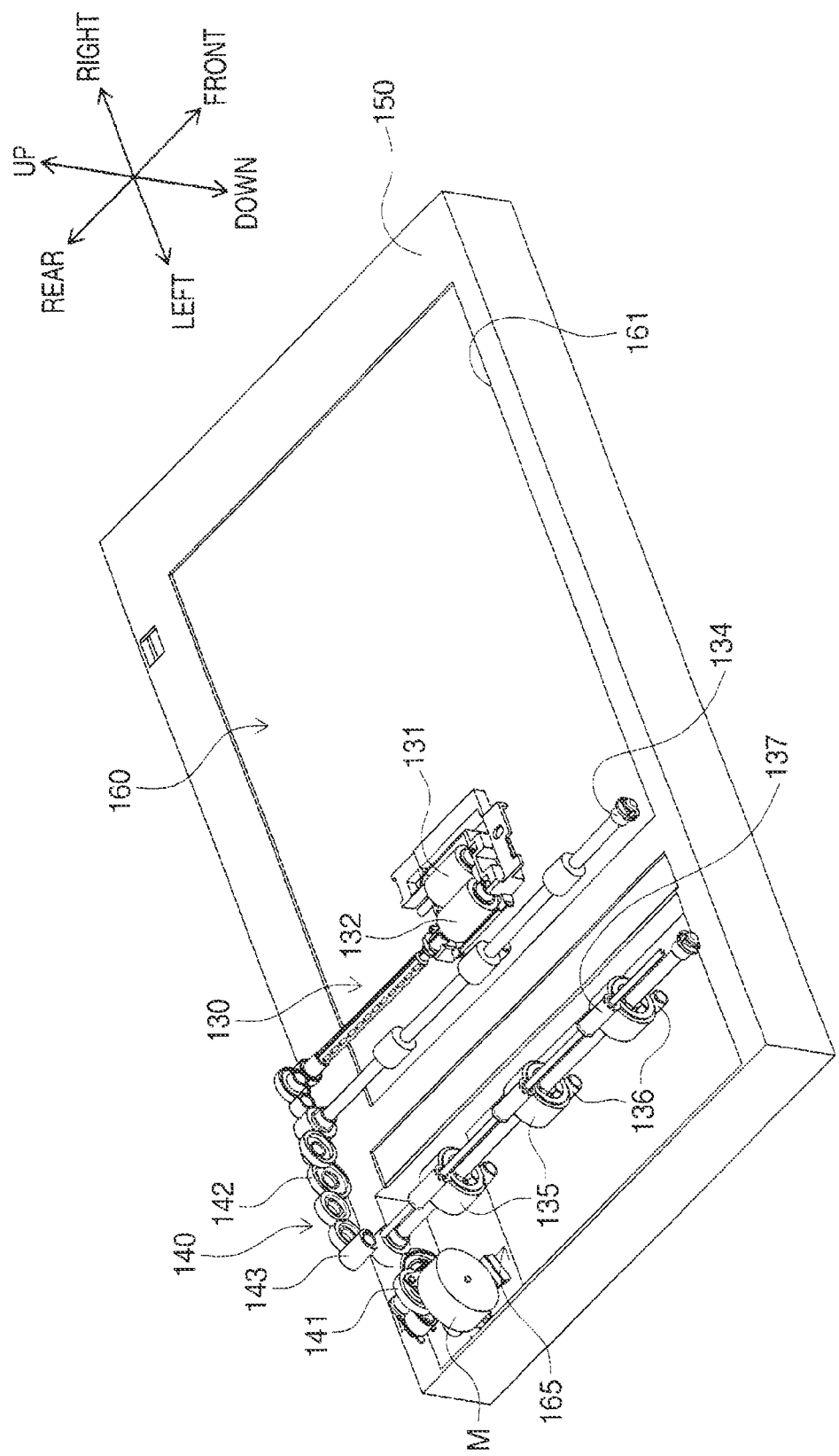

FIG. 11 is a perspective view of a driving motor, a document feeding mechanism, and a transmission mechanism of the MFD 100 according to the second embodiment of the present invention.

Figure 12:
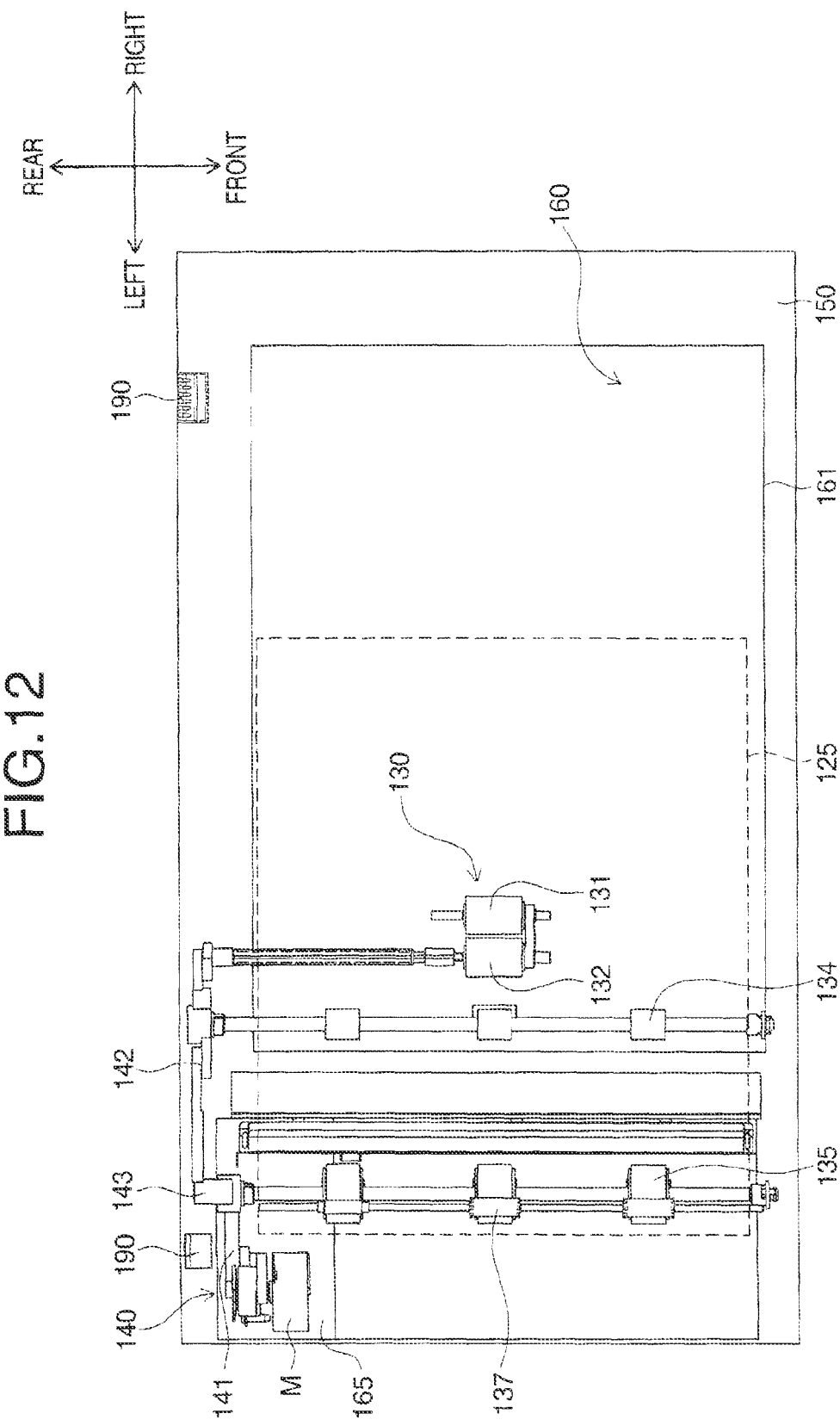

FIG. 12 is a top view showing a layout of the driving motor, the document feeding mechanism, and the transmission mechanism of the MFD 100 according to the second embodiment of the present invention.

Figure 13:
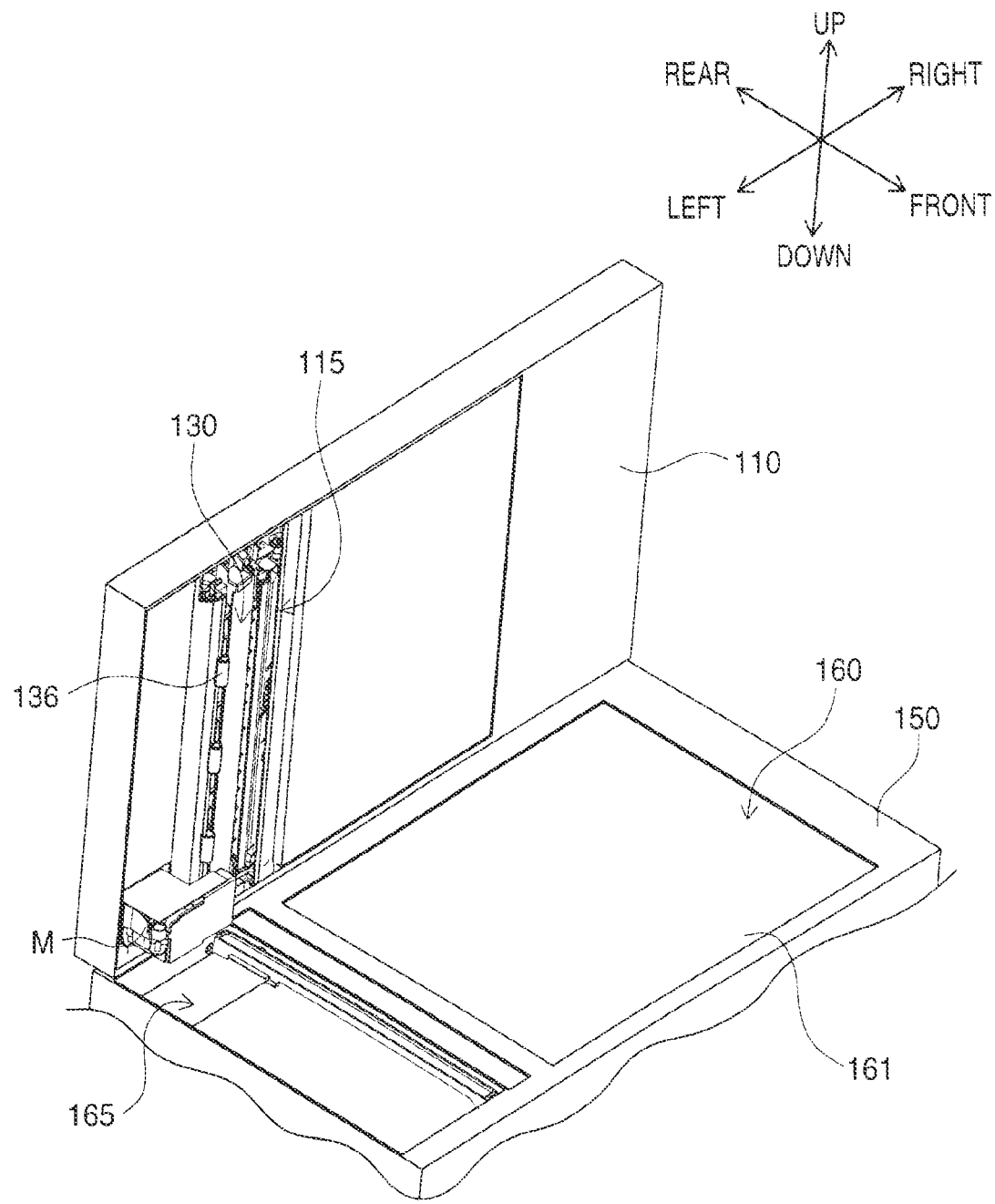

FIG. 13 illustrates the upper cover in an open position in the MFD 100 according to the second embodiment of the present invention.

Figure 14A:
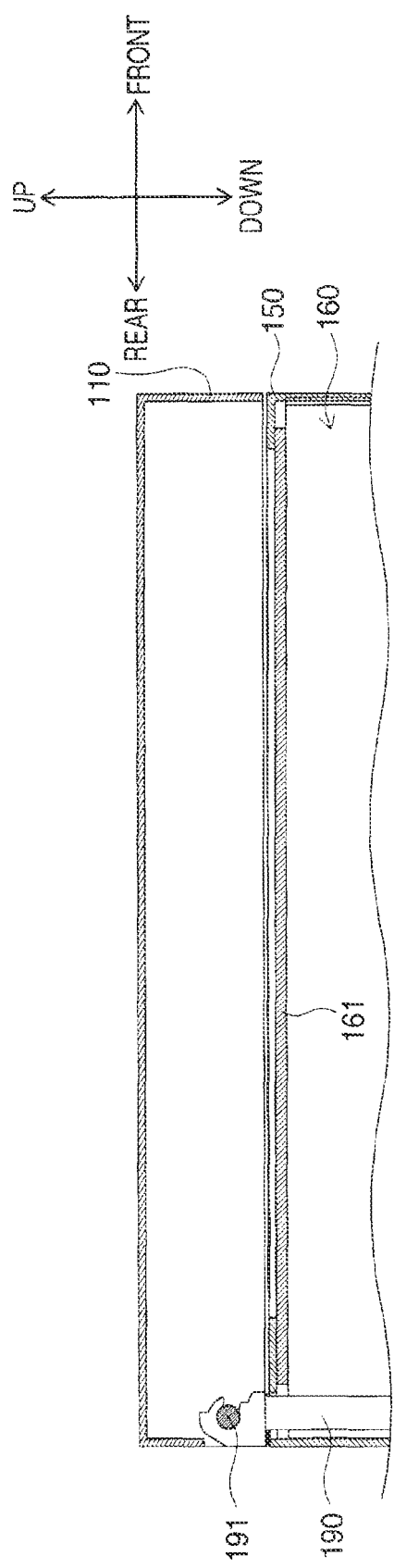
Figure 14B:
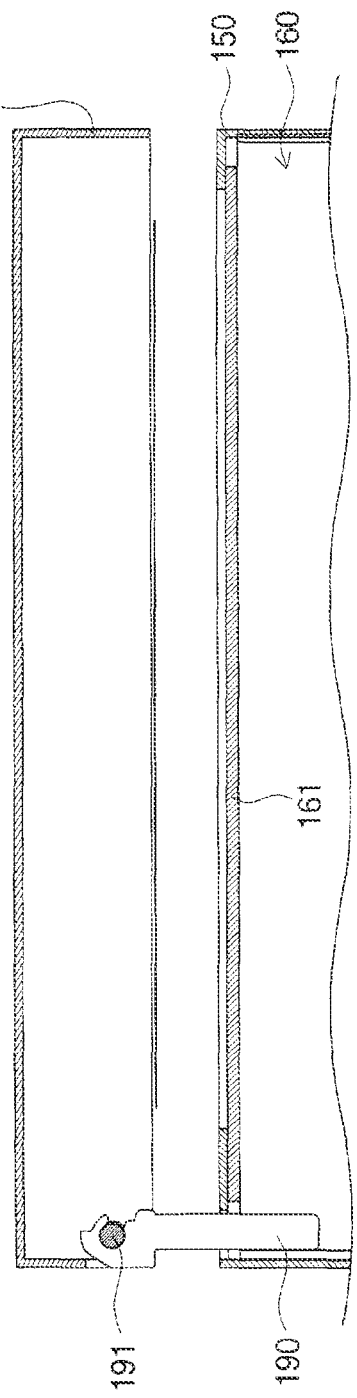

FIGS. 14A and 14B are cross-sectional side views a hinge member in the MFD 100 according to the second embodiment of the present invention.

Figure 15:
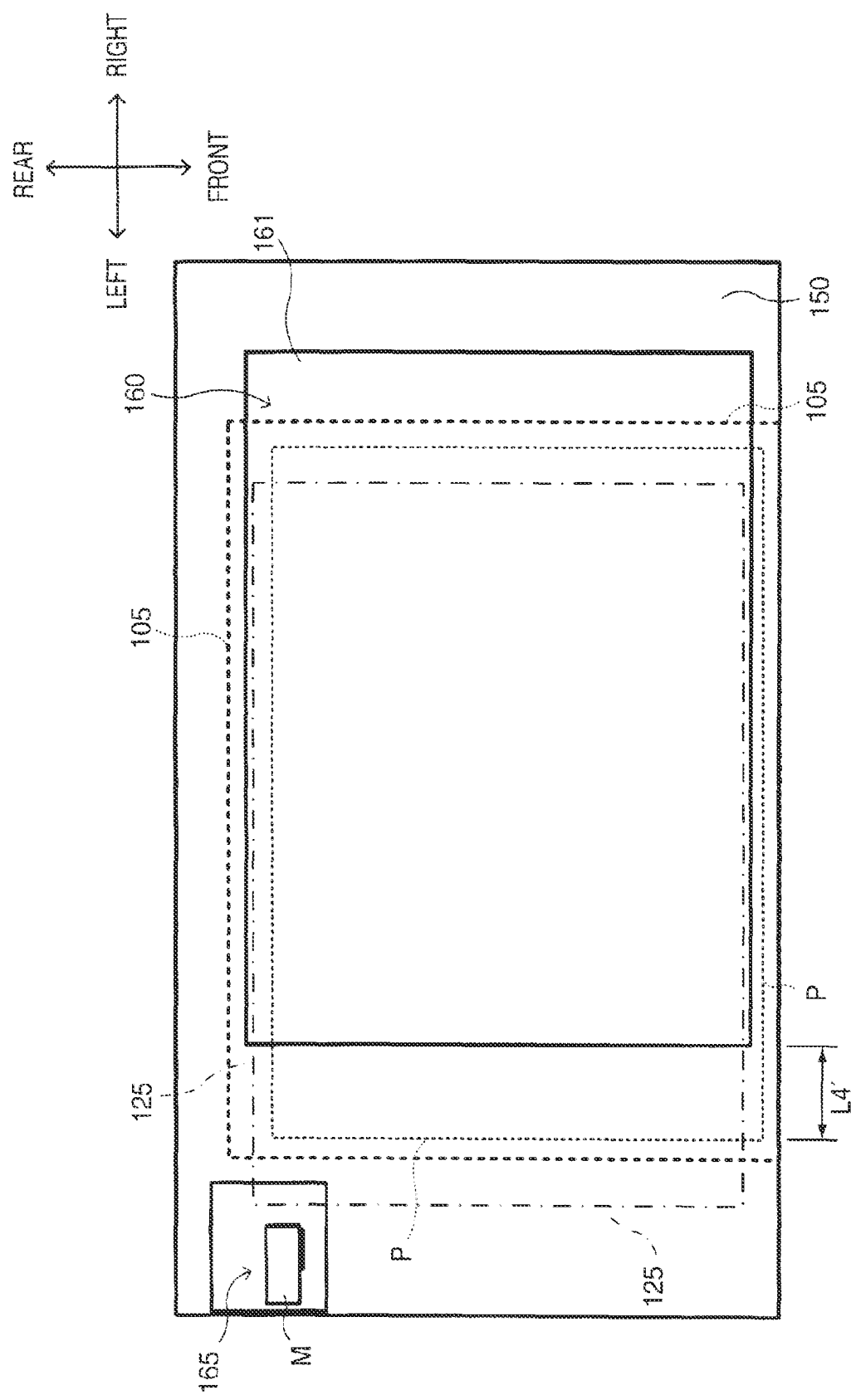

FIG. 15 is a top view showing a layout of the driving motor, a sheet conveyer path, and a recording sheet placed in a sheet cassette in the MFD 100 according to the second embodiment of the present invention.

Figure 16:
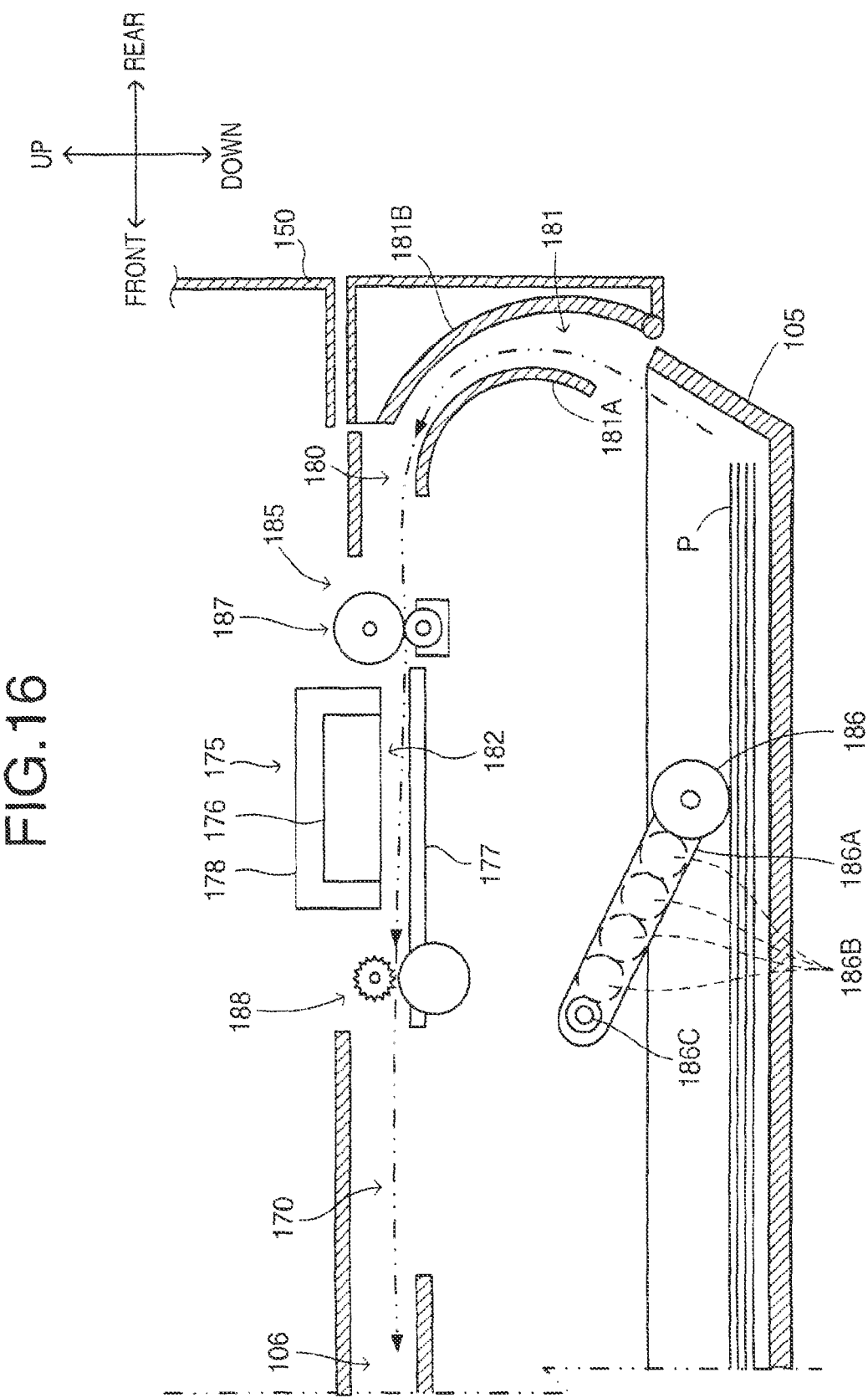

FIG. 16 is a cross-sectional side view of a printer unit in the MFD 100.

DETAILED DESCRIPTION

Hereinafter, embodiments according to aspects of the present invention will be described with reference to the accompanying drawings. In the embodiments described below, directions concerning the MFDs 10, 100 will be referred to based on orientations indicated by arrows shown in each drawing. For example, in FIGS. 1 and 2, a viewer's lower-left side, upper-right side, a lower-right side, and an upper-left side, will be referred to as front, rear, right, and left for the MFD 10 respectively. An up-down line 7 in FIGS. 1 and 2 corresponds to a vertical direction of the MFD 10, including orientations from top toward bottom and from bottom toward top. A front-rear direction 8 of the MFD 10 may also be referred to as a direction of depth. The front-rear direction 8 may include orientations from front toward rear and from rear toward front. A right-left direction 9 of the MFD 10 may also be referred to as a crosswise direction. The right-left direction 9 may include orientations from right toward left and from left toward right.

First Embodiment

Overall Configuration of the MFD 10

Figure 1:
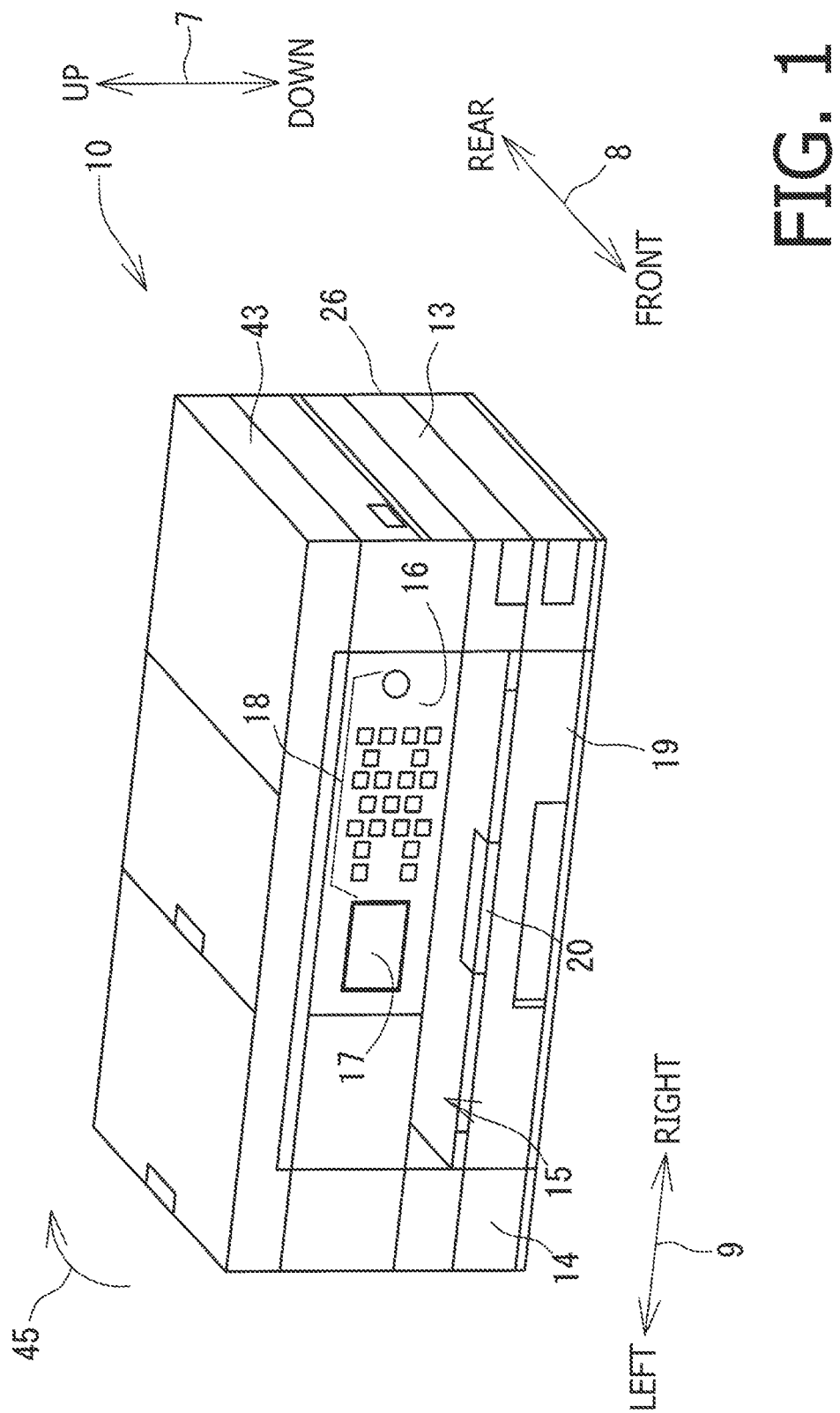
FIG. 1 is a perspective view of an MFD 10 according to an embodiment of the present invention with an original sheet cover 43 in a closed position and a discharge tray 20 in a nested (non-usable) position.
Figure 2:
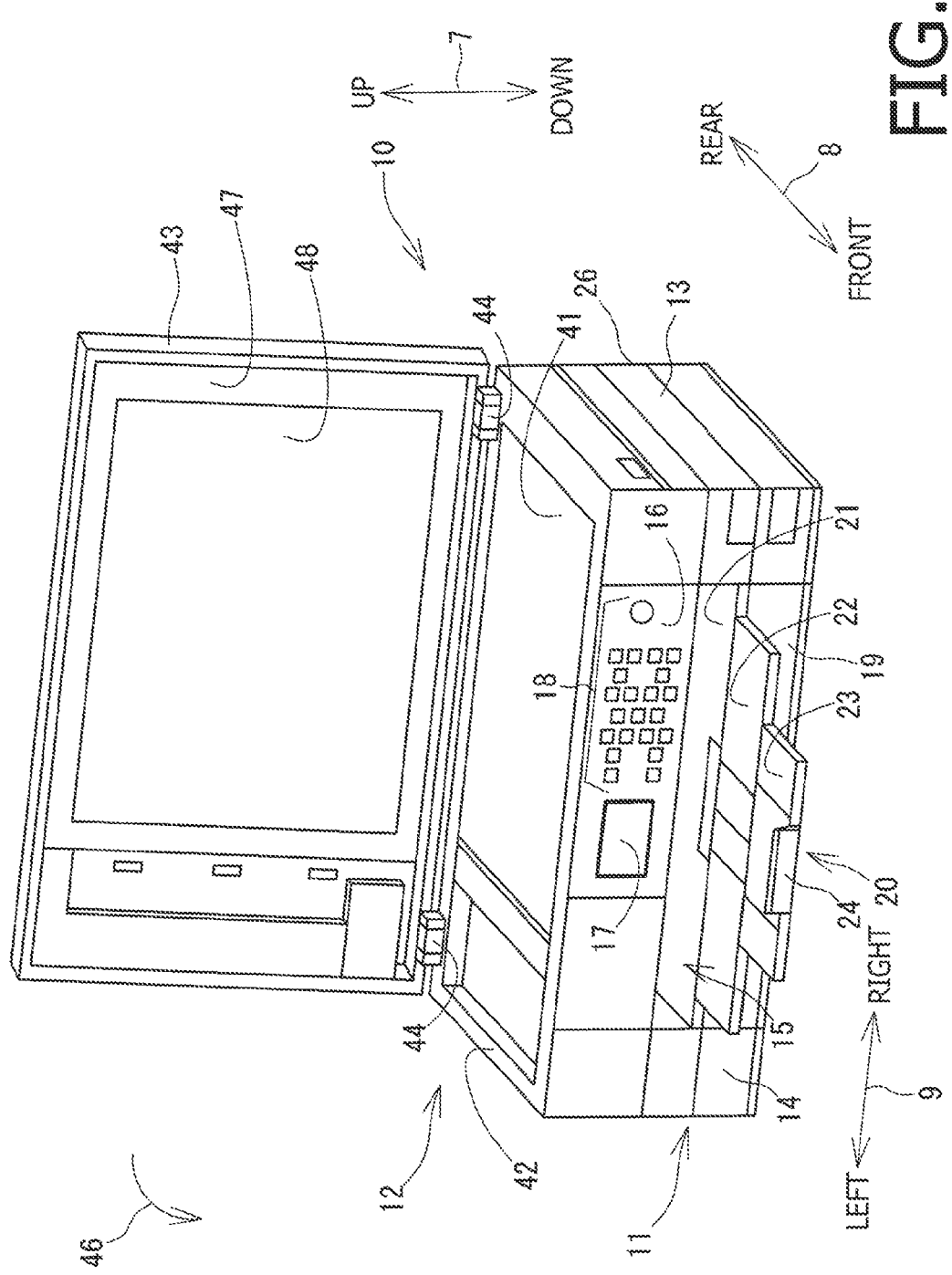
FIG. 2 is a perspective view of the MFD 10 according to the embodiment of the present invention with the original sheet cover 43 in an open position and the discharge tray 20 in an extended usable position.

The MFD 10 shown in FIGS. 1 and 2 is a multifunction device, which is equipped with a printer unit 11 and a scanner unit 12. The MFD 10 has a chassis 13, which is formed to have a shape of an approximately six-sided box, and dimensions in the front-rear direction 8 and in the right-left direction 9 of the box are greater than a dimension in the vertical direction 7. The chassis 13 accommodates the printer unit 11 being an inkjet printer and the scanner unit 12 being a flatbed scanner. The scanner unit 12 is arranged in an upper position with respect to the printer unit 11.

Figure 6:
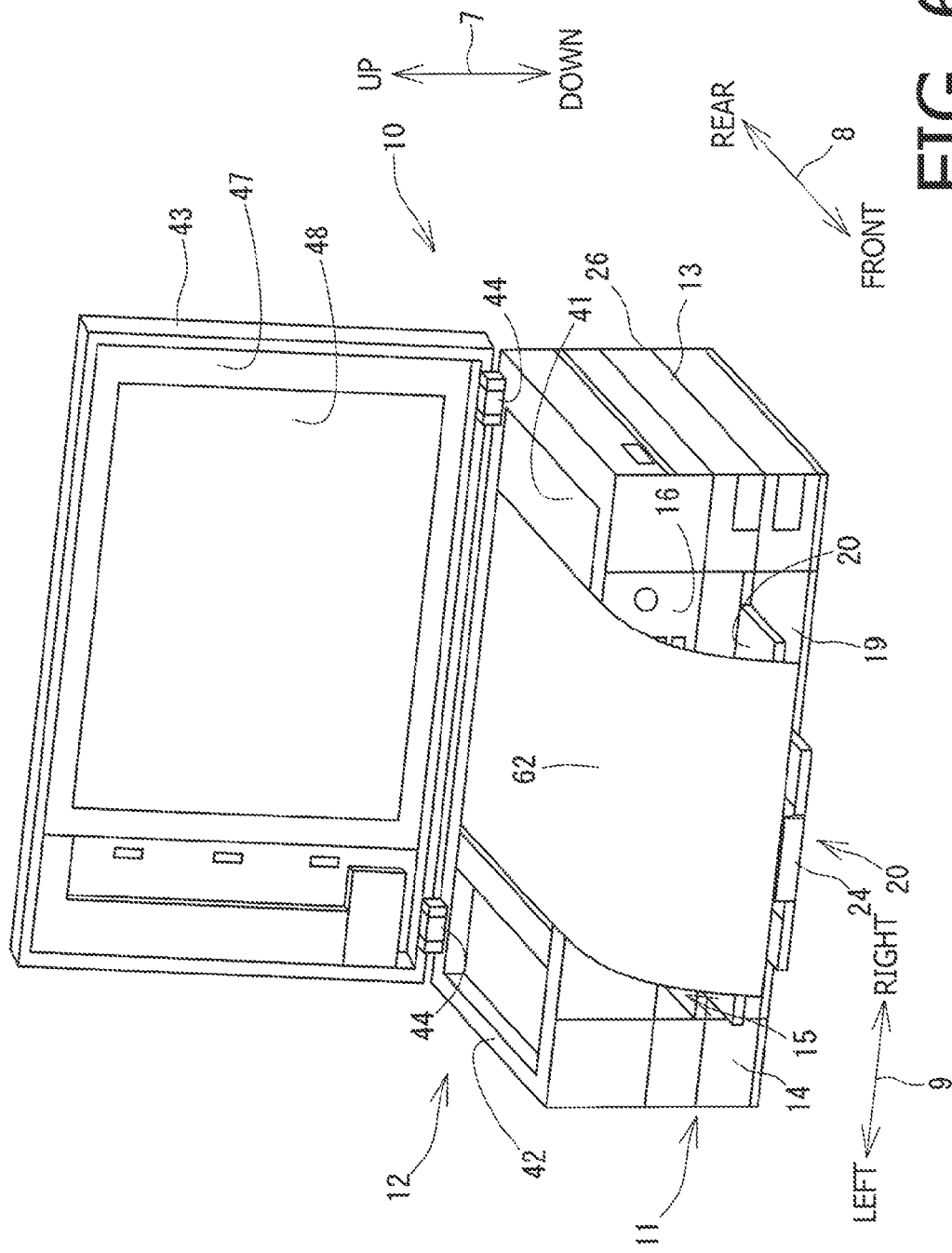
FIG. 6 is a perspective view of the MFD 10 according to the embodiment of the present invention with a larger-sized original sheet 62 placed partially on a contact glass 41 in the scanner unit.

On a front face 14 of the chassis 13, an operation panel 16 is provided. The operation panel 16 has a liquid crystal display (LCD) panel 17 and a plurality of operation buttons 18. The LCD panel 17 and the operation buttons 18 are electrically connected with a control circuit (not shown), which controls behaviors of the printer unit 11 and the scanner unit 12. The user may manipulate the printer unit 11 and the scanner unit 12 via the operation panel 16. For example, the user may touch or press the operation button 16 to activate a copying function of the MFD 10 by manipulating the scanner unit 12 to read an image from an original sheet 62 (see FIGS. 6 and 7) and the printer unit 11 to record the read image on a recording sheet 61 (see FIGS. 3 and 7).

Printer Unit 11

As shown in FIGS. 1 and 2, the MFD 10 has a sheet-feed tray 19, in which recording sheets 61 can be stored. The sheet-feed tray 19 is slidable with respect to the MFD 10 along the front-rear direction 8 and is detachably attached to the MFD 10 through an opening (not shown) formed in the front face 14 of the chassis 13. In an upper position with respect to the sheet-feed tray 19, a discharge tray 20, in which the recording sheet 61 with the image recorded thereon are disposed, is provided. On the front face 14 of the chassis 13, an opening 15, through which the recording sheets 61 disposed in the discharge tray 20 can be accessed, is formed. The sheet-feed tray 19, the discharge tray 20, and the opening 15 are arranged in lower positions with respect to the operation panel 16.

The discharge tray 20 includes an inner section 21, a first extendable section 22, and a second extendable section 23 (see FIG. 2). The inner section 21 is stored in an inner side of the chassis 13 with respect to the opening 15 when the discharge tray 20 is in a usable position (see FIG. 2) and in a non-usable nested position (see FIG. 1). The first extendable section 22 and the second extendable section 23 are extendable from the inner section 21 outward with respect to the opening 15. Thus, when in the usable position, the discharge tray 20 is partially extended outward from the opening 15. Therefore, the recording sheets 61 disposed in the discharge tray 20 can be placed partially on the outside of the front face 14 of the chassis 13 at a downstream part of the recording sheet 61 along a sheet conveying direction. On a front edge of the second extendable section 23, an upward stopper projection 24 is formed. The recording sheets 61 disposed in the discharge tray 20 can be in contact with the stopper projection 24 at front (downstream) ends thereof along the sheet conveying direction and can be restricted from slipping further frontward beyond the front edge. The position in which the recording sheets 61 are disposed will be described later in detail.

The discharge tray 20 is thus movable along the front-rear direction 8 to change its postures to be expanded and contracted between the nested posture (see FIG. 1) and the usable posture (see FIG. 2). When no image recording operation is conducted, the discharge tray 20 may be placed in the nested posture, and when an image recording operation, including a copying operation, is conducted, the discharge tray 20 is placed in the usable posture. When the discharge tray 20 is shifted from the usable posture to the nested posture, the user pushes the second extendable section 23 rearward along the front-rear direction 8 at the front edge. Thus, the second extendable section 23 is moved with respect to the first extendable section 23 rearward and nested inside the first extendable section 22. When the user pushes the second extendable section 23 further rearward, the first extendable section 23 containing the second extendable section 23 is moved with respect to the inner section 21 rearward and nested inside the inner section 21. Thus, the first extendable section 22 and the second extendable section 23 are nested inside the inner section 21 to be placed in the inner position in the chassis 13 with respect to the opening 15. When no image recording operation is conducted, the user may place the discharge tray 20 in the nested posture to clear space in front of the front face 14 of the MFD 10. However, it is noted that the discharge tray 20 may not necessarily be movable to extend frontward beyond the edge of the opening 15 but may be formed to stay inside the front face 14 of the chassis 13 at all time.

The discharge tray 20 in the nested position is shifted into the usable position when the user pulls the front end of the second extendable section 23 frontward along the front-rear direction 8.

Figure 3:
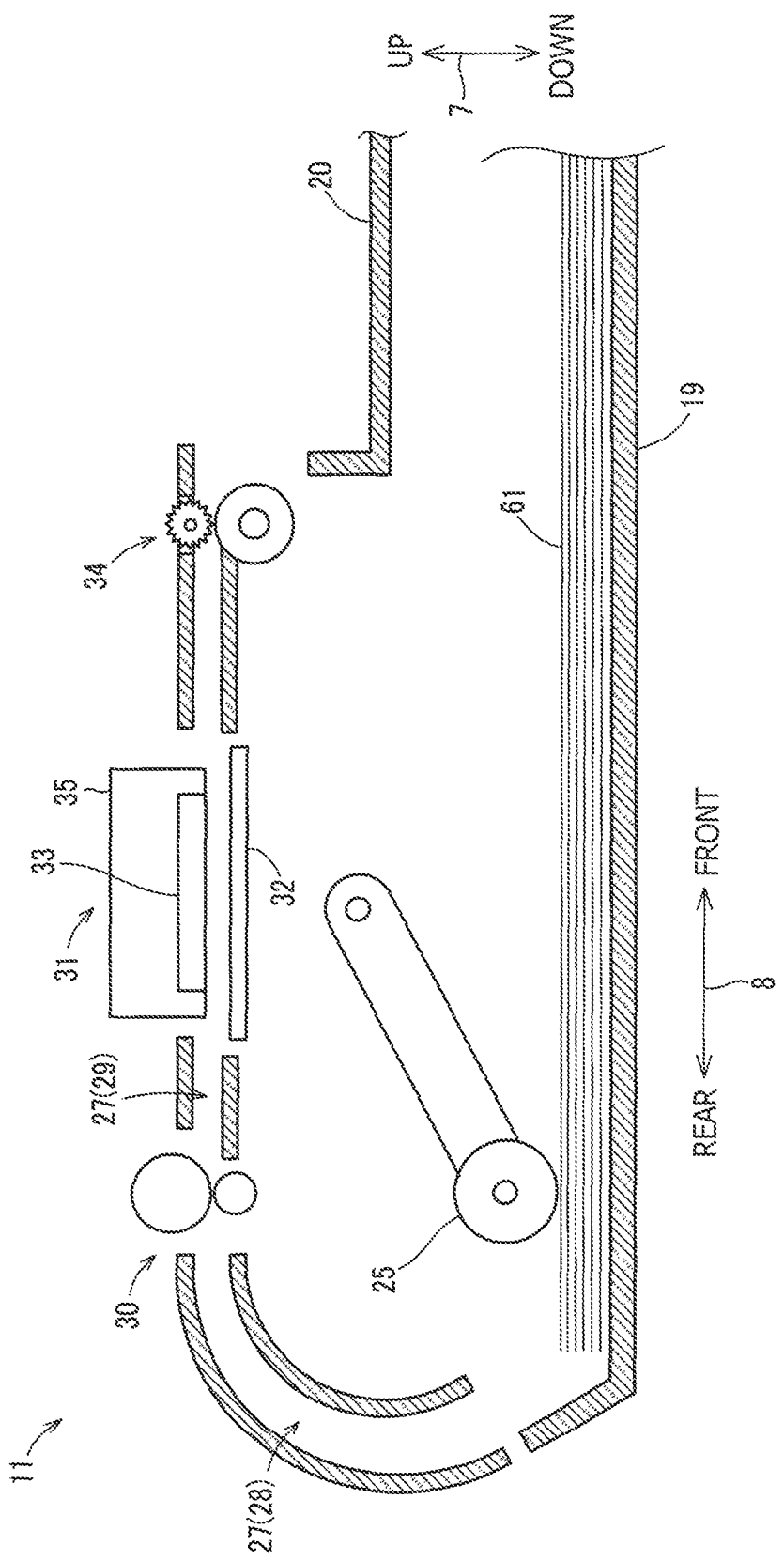
FIG. 3 is a cross-sectional partial view of a printer unit 11 in the MFD 10 according to the embodiment of the present invention.

The printer unit 11 as shown in FIG. 3 records an image on the recording sheet 61 by selectively ejecting ink droplets onto a surface of the recording sheet 61. However, the printer unit 11 may not necessarily print the image by ejecting the ink droplets in the inkjet-printing method but may print in, for example, thermal-transfer method. The printer unit 11 includes, in addition to the sheet-feed tray 19 and the discharge tray 20, a conveyer path 27, in which the recording sheet 61 is conveyed, rollers to convey the recording sheet 61 along the conveyer path 27, and a recording unit 31 to record the image on the recording sheet 61 being conveyed in the conveyer path 27.

In an image recording operation, the recording sheet 61 stored in the sheet-feed tray 19 is picked up by a feed roller 25 and carried rearward along the direction 8 of depth toward a rear face 26 (see FIG. 4) of the chassis 13. Further, the recording sheet 61 is conveyed to a U-curved path 28, which is formed to curve upwardly in an arc, in the conveyer path 27. The recording sheet 61 is therefore carried along the U-curved path 27 upwardly and thereby vertically inverted. A downstream end of the U-curved path 28 along the sheet conveying direction is connected with a linear path 29 in the sheet conveyer path 27. The linear path 29 extends linearly along the front-rear direction 8 and directs the recording sheet 61 frontward as conveyer rollers 30 rotate. In the present embodiment, the frontward orientation along the front-rear line 8 coincides with the sheet conveying direction. The front side of the MFD 10 corresponds to a downstream side along the sheet conveying direction, and the rear side of the MFD 10 corresponds to an upstream side along the sheet conveying direction.

Along the linear path 29, the recording unit 31 to record the image on the recording sheet 61 is arranged. The recording unit 31 includes a platen 32, which holds the recording sheet 61 from below, and a recording head 33, which is arranged in an upper opposite position with respect to the platen 32 across the linear path 29. The recording head 33 is supported by a carriage 35 and reciprocates in the crosswise direction 9 along with the carriage 35. The recording head 33 reciprocating in the crosswise direction 9 selectively ejects the ink droplets onto the upper surface of the recording sheet 61 being carried on the platen 32. Thus, the image is formed in ink on the recording sheet 61. The recording sheet 61 passing over the platen 32 is carried further by the discharge rollers 34 and disposed in the discharge tray 20, which is arranged at a downstream end of the linear path 29.

Scanner Unit 12

Figure 4:
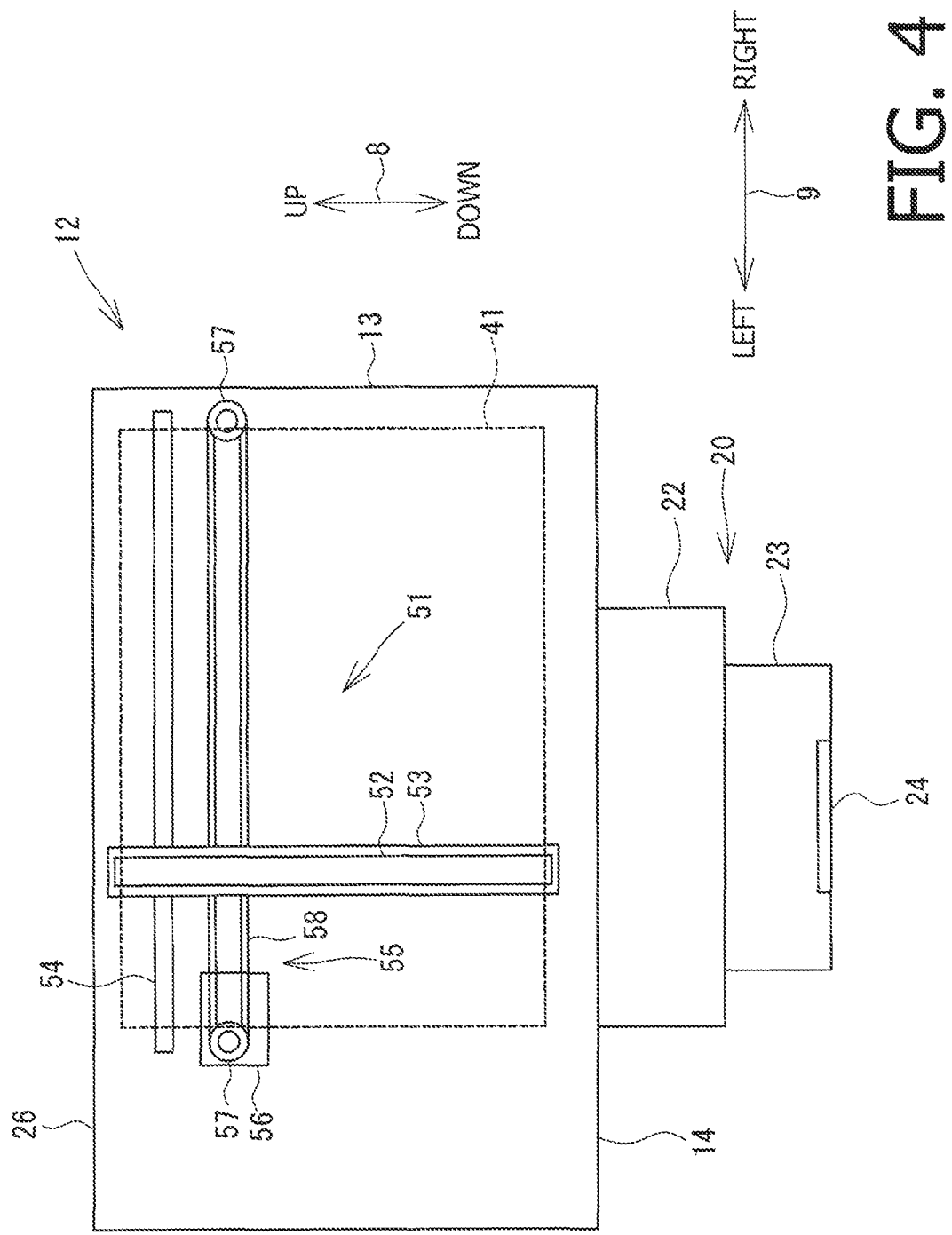
FIG. 4 is a plane view of a scanner unit 12 without the original sheet cover 43 in the MFD 10 according to the embodiment of the present invention.

The scanner unit 12, as shown in FIG. 4, is a flatbed scanner, which is configured to read the image formed on the original sheet 62 placed on a piece of contact glass 41. The contact glass 41 is made of a transparent material, such as glass and an acrylic resin, and is arranged on an upper plane 42 of the chassis 13. Further, in an upper position with respect to the chassis 13, an original sheet cover 43 (see FIGS. 1 and 2) is provided. The original sheet cover 43 is coupled to the rear face 26 of the chassis 13 via hinges 44 (see FIG. 2). The original sheet cover 43 is pivotable about the hinges 44 in pivot directions 45 (see FIG. 1), 46 (see FIG. 2) to expose and cover the contact glass 41.

On an underside 47 of the original sheet cover, a presser 48 is provided. The presser 48 may be, for example, but not limited to, a sheet of sponge. For another example, the presser 48 may be made of a resilient material such as rubber. The presser 48 is formed and arranged to cover a top surface of the contact glass 41 when the original sheet cover 43 is in a closed position (see FIG. 1). When in the closed position, the presser 48 presses the original sheet 62 on the contact glass 41 downward and holds the original sheet 62 steady thereat.

As shown in FIG. 4, in a position underneath the contact glass 41, an image reading unit 51 is provided. The image reading unit 51 includes a line sensor 52, a carriage 53, a shaft 54, and a belt driving system 55.

A bar-shaped line sensor 52 is arranged in a lower position with respect to the contact glass 41 with its longitudinal direction aligned with the front-rear direction 8. The line sensor 52 casts light on an image readable area E3 (see FIG. 5), which will be described later in detail, in the contact glass 41 and receives reflected light. In the present embodiment, the line sensor 52 employs a contact image sensor (CIS). The line sensor 52 includes light sources, lenses, and light receiving elements, which are not shown. The light sources, the lenses, and the light receiving elements are arranged in line along the longitudinal direction (i.e., the front-rear direction 8) of the line sensor 52, which is a main scanning direction.

The line sensor 52 is supported by the carriage 53 from below, and the carriage 53 is attached to the shaft 54, which is arranged with a longitudinal direction to align the crosswise direction 9.

The carriage 53 is driven by the belt driving system 55, which includes a motor 56, a pulley 57, and a belt 58, to reciprocate in the crosswise direction 9 being a sub-scanning direction along the shaft 54. When the carriage 53 reciprocates, the line sensor 52 mounted on the carriage 53 moves along with the carriage 53 to reciprocate in the crosswise direction 9. Whilst being moved along with the carriage 53, the line sensor 52 emits light from the light sources toward the contact glass 41. The light emitted and reflected is collected via the lenses and received in the light receiving elements to be converted into electrical signals. The electrical signals are transmitted to the control circuit, which converts the electrical signals to image data.

Positional Relation Between the Printer Unit 11 and the Scanner Unit 12

Figure 5:
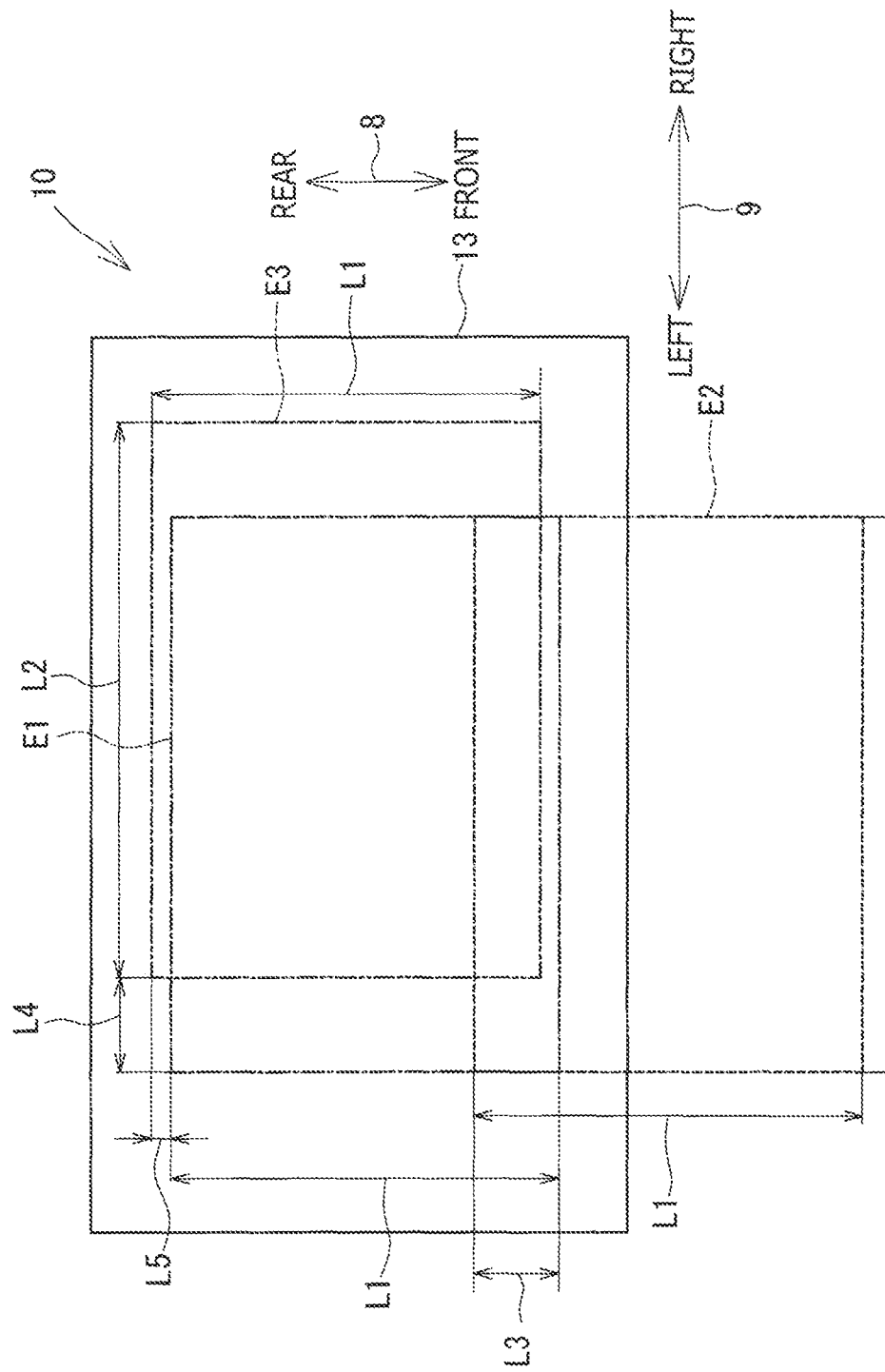
FIG. 5 is a plane view to illustrate positional relation amongst an initial placement area E1 and a discharge area E2 in the printer unit 11 and an image readable area E3 in the scanner unit 11 in the MFD 10 according to the embodiment of the present invention.

FIG. 5 shows a simplified top plane view of the MFD 10. In FIG. 5, positional relation amongst areas to be occupied by the recording sheet 61 when the recording sheet 61 is in the sheet-feed tray 19 (in an initial placement area E1) and in the discharge tray 20 (in a discharge area E2) and the image readable area E3 for the scanner unit 12 is shown. For simplified illustration, the MFD 10 is represented by the outline of the chassis 13, and the remaining structure is omitted in FIG. 5. According to the present embodiment, a dimension of the depth of the chassis 13 along the front-rear direction 8 is 290 mm, and a dimension of the width along the right-left direction 9 is 480 mm.

The initial placement area E1, which is indicated by a dash-dotted line in FIG. 5, represents a plane area, which is occupied by a recording sheet 61 in a maximum usable size when the maximum usable-sized recording sheet 61 is placed in the sheet-feed tray 19. The maximum usable size refers to a maximum size for the recording sheet 61 to be carried in the sheet conveyer path 27. The initial placement area E1 is entirely set within the outline of the chassis 13. In the initial placement area E1, a crosswise dimension L2 along the crosswise direction 9 is greater than a dimension of depth L1 along the front-rear direction L1. Thus, the recording sheet 61 is placed in the sheet-feed tray 19 to have longer edges thereof aligned in parallel with the crosswise direction 9.

A ratio of the dimension of depth L1 with the crosswise dimension L2 may be, but not limited to, 1:1.41. Recording sheets in this aspect ratio are known as "A series" in standards defined by an ISO (International Organization for Standardization) 216 and JIS (Japan Industrial Standards) P0138. In the present embodiment, the dimension of depth L1 is 210 mm, and the crosswise dimension L2 is 297 mm. The sheet size 210 mm×297 mm is specifically known as A4 size in the A series. The sheet conveying path 27 is thus capable of conveying the A4-sized recording sheet 61 at maximum with shorter edges thereof being in parallel with the sheet conveying direction. Therefore, the sheet conveyer path 27 is formed to be greater in width along the crosswise direction 9 than the dimension of the longer edges of the recording sheet 61 (i.e., 297 mm). It is to be noted that the dimensions L1 and L2 may not necessarily be in the figures described above but may be in other figures.

The discharge area E2, which is indicated by a broken line in FIG. 5, represents a plane area, which is occupied by the maximum usable-sized recording sheet 61 when the maximum usable-sized recording sheet 61 is disposed in the discharge tray 20 after an image recording (copying) operation. As has been mentioned above, the recording sheet 61 is picked up from the sheet-feed tray 19 and carried rearward along the direction 8 of depth to be fed in the sheet conveyer path 27. Further, the recording sheet 61 is turned over via the U-curved path 28, carried further in the linear path 29, and disposed in the discharge tray 20. Whilst the recording sheet 61 is conveyed from the sheet-feed tray 19 to the discharge tray 20, the recording sheet 61 is not displaced in the crosswise direction 9 but stays within the same width. In other words, the discharge area E2 coincides with the initial placement area E1 with regard to the width along the crosswise direction 9.

Nonetheless, the position of the recording sheet 61 disposed in the discharge tray 20 with respect to the front-rear direction 8 may vary depending on an image recording speed for the recording sheet 61. However, the recording sheet 61 released in the discharge tray 20 is restricted from slipping further beyond the stopper projection 24 of the discharge tray 20, and the discharge area E2 is defined based on the position of the stopper projection 24 which stops the recording sheet 61 thereat.

As has been described above, the discharge tray 20 is extended beyond the front face 14 of the chassis 13 at the first extendable section 22 and the second extendable section 23. Therefore, a front part of the discharge area E2 is in a position outside the chassis 13, more specifically, frontward with respect to the front face 14 of the chassis 13 along the front-rear direction 8. Meanwhile, a rear part of the discharge area E2 overlaps a front part of the initial placement area E1 for an amount with a length L3. The length L3 is approximately 20% of the dimension L1 being the length of the shorter edge of the recording sheet 61. In the present embodiment, the length L3 is set to be 46.24 mm. The length L3 may vary depending on an amount for the discharge tray 20 to be extended from the front face 14 of the chassis 13 and the dimension of depth of the chassis 13 along the front-rear direction 8.

An image readable area E3, which is indicated by a double-dotted chain line in FIG. 5, represents a plane area, which can be scanned by the line sensor 52 to read an image, on the contact glass 41 of the scanner unit 12. In the present embodiment, the dimension of depth of the image readable area E3 along the front-rear direction 8 and the crosswise dimension along the crosswise direction 9 are equivalent to the dimensions of the edges of the maximum usable sized recording sheet 61 along the front-rear direction 8 and along the crosswise direction 9 respectively. Therefore, the dimension of depth of the image readable area E3 along the front-rear direction 8 is L1, and the crosswise dimension of the image readable area E3 along the crosswise direction 9 is L2. In other words, the image readable area E2 for the line sensor 52 is in the size of A4. However, the dimensions of the image readable area E3 may not necessarily be identical with the dimensions of the maximum usable sized recording sheet 61.

Leftward ends of the initial placement area E1 and the discharge area E2 are in positions to be apart leftward from a leftward end of the image readable area E3 for a length L4 along the crosswise direction 9. Therefore, whilst the crosswise dimensions of the initial placement area E1, the discharge area E2, and the image readable area E3 are equivalent from one another, the initial placement area E1 and the discharge area E2 are displaced from the position to fully coincide with the image readable area E3 for the leftward length L4 along the crosswise direction 9. The length L4 may be, for example, approximately 17% of the crosswise dimension L2, and according to the present embodiment, the length L4 is 51.2 mm. In the present embodiment, the leftward orientation along the crosswise line 9 is perpendicular to the sheet conveying direction, and the left-hand side of the MFD 10 is a downstream side in the leftward orientation, and the right-hand side of the MFD 10 corresponds to an upstream side in the leftward orientation.

Nevertheless, the initial placement area E1 and the discharge area E2 may not necessarily be displaced leftward with respect to the image readable area E3 along the crosswise direction 9 but may be displaced rightward with respect to the image readable area E3 along the crosswise direction 9. In other words, rightward ends of the initial placement area E1 and the discharge area E2 may be in positions to be apart rightward from a rightward end of the image readable area E3 for the length L4 along the crosswise direction 9. In such a case, the rightward direction along the crosswise line 9 should be referred to as the second direction.

A rear end of the of the initial placement area E1 along the direction 8 of depth is in a position to be apart frontward from a rear end of the image readable area E3 for a length L5 along the direction 8 of depth. Therefore, whilst the dimensions of depth of the initial placement area E1 and the image readable area E3 are equivalent from each other along the direction 8 of depth, the initial placement area E1 is displaced from the position to fully coincide with the image readable area E3 for the frontward length L5 along the direction 8 of depth.

According to the present embodiment, the length L5 is smaller than the length L4. Therefore, the initial placement area E1 is displaced from the image readable area E3 for the larger amount L4 along the crosswise direction 9 than the displaced amount L5 along the direction 8 of depth. In the present embodiment, the length L4 is 51.2 mm whilst the length L5 is 10.54 mm; therefore, the displaced amount L4 along the crosswise direction 9 is approximately five times larger than the displaced amount L5 along the direction 8 of depth.

Copying Operation in Detail

A copying operation to read an image appearing on a larger recording sheet 62, which is larger than the image readable area E3, and to record the read image on the recording sheet 61 will be described hereinbelow.

When the user starts the copying operation, the user places the original sheet cover 43 in the open position and places the discharge tray 20 in the usable position (see FIG. 2). Further, the user places the original sheet 62 on the contact glass 41. In particular, a side of the original sheet 62 having the image to be read is placed downward, and a part of the original sheet 62 including the image to be read is placed in a position to coincide with the image readable area E3 of the contact glass 41. In this regard, another part of the original sheet 62, which does not include the image to be read, may fall out of the contact glass 41 depending on a size of the original sheet 62 and a position of the area with the image to be read.

For example, a size A3, which is one of the A series, has a dimension of 297 mm for the longer edges. Meanwhile, the dimension of 297 mm is equal to the dimension of the longer edges for the A4-sized recording sheet 61. Therefore, when the image appearing on one side of the original sheet 62 with respect to a lengthwise center is read, the user may place the original sheet 62 with the longer edges aligned in parallel with the front-rear direction 8 on the contact glass 41 (see FIG. 6). In this regard, the other side of the original sheet 62, which does not have the image to be read, may fall out of the contact glass 41 and hang over the discharge tray 20.

The user may place the original cover 43 on the original sheet 43, which partially falls out of the contact glass 41, to hold the original sheet 62 at least partially on the contact glass 41. Optionally, the original sheet 62 may be a page in a book with a specific thickness, and the original sheet cover 43 may not be fully placed back to the closed position (see FIG. 1). In such a case, the user may press the original sheet 62 downward by hand against the contact glass 41 to hold the original sheet 62 steady.

With the original sheet 62 being held on the contact glass 41, the user inputs instructions to manipulate the MFD 10 to start copying. The instructions may be input via a computer, which is connected with the MFD 10, or may be input via the operation panel 16 arranged on the front face 14 of the chassis 13.

When the instructions are entered, the control circuit manipulates the printer unit 11 and the scanner unit 12 to create a copy of the image formed on the original sheet 62. More specifically, the line sensor 52 reads the image appearing on the original sheet 62 from the position below the contact class 41, and image data representing the read image is created. Meanwhile, the recording sheet 61 is picked up from the sheet-feed tray 19 and fed in the sheet conveyer path 27. As the recording sheet 61 passes by the recording unit 31, the recording head 33 ejects ink droplets onto the surface of the recording sheet 61. Thus, the image as read from the original sheet 62 is recorded on the recording sheet 61. The recording sheet 61 with the recorded image is disposed in the discharge tray 20.

The MFD 10 with the original sheet 62 on the contact glass 41 and with the recording sheet 61 disposed in the discharge tray 20 is illustrated in FIG. 7. In FIG. 7, the original sheet cover 43 is omitted. As shown in FIG. 7, the original sheet 62 partially falls out of the image readable area E3 and covers a part of the recording sheet 61 in the discharge tray 20. However, a left-side part of the recording sheet 61, which coincides with the length L4 along the crosswise direction 9, is not covered by the original sheet 62 but exposed to be seen by the user.

When the crosswise dimension of the original sheet 62 placed on the contact glass 41 is greater than the crosswise dimension of the contact glass 41 along the crosswise direction, the original sheet 62 may fall out of the contact glass 41 not only frontward along the front-rear direction 8 but also along the crosswise direction 9. In such a case, however, the user may place the original sheet 62 to have the left-hand end of the original sheet 62 aligned with the left-hand end of the image readable area E3. Thereby, a right-side part of the original sheet 62 may fall out beyond the right-side end of the contact glass 41. Meanwhile, the original sheet 62 is still prevented from hanging over the left-side part of the recording sheet 61. In other words, the left-side part of the recording sheet 61 is maintained exposed to be seen by the user.

Effects

According to the embodiment described above, even when the user makes a copy of the image appearing on the original sheet 62, which is larger than the contact glass 41, the left-side part corresponding to the length L4 of the recording sheet 61 disposed in the discharge tray 20 can be exposed to be seen from the user. Therefore, the user can inspect a condition of the image recorded on the recording sheet 61 based on the image appearing on the exposed part.

When the user observes the part of the recorded image via the exposed part, the user may inspect, for example, whether the image is recorded in a correct orientation or in a correct position. Further, density and tones of colors in the recorded image may be inspected. Thus, the user may notice incorrectness or unexpected errors in the recorded image, if any, before the original sheet 62 is removed from the contact glass 41. Therefore, the user may be released from the cumbersome process to remove the original sheet 62 from the contact glass 41 and place the original sheet 62 back again on the contact glass 41 in order to retry the copying operation.

It is to be noted that, even in the conventional MFD, in which the original sheet 62 may completely cover the discharged recording sheet 61, the recording sheet 61 disposed in the discharge tray 20 may be seen by flipping the original sheet 62 upward. However, when the original sheet 62 is flipped upward, the original sheet 62 may be easily displaced from the initially placed position on the contact glass 41. In particular, when the original sheet 62 is a part of a book with thickness, the original sheet 62 may be displaced even more easily. When the original sheet 62 is displaced from the initial position, the user may have to repeat the cumbersome process to place the original sheet 62 back again on the contact glass 41 in order to retry the copying operation.

According to the embodiment described above, further, when the image is recorded on a plurality of recording sheets 61, the user may abort the copying operation as soon as the user finds an error in the image formed on the one side of the recording sheets 61. Therefore, it can be prevented that the erroneous image is continuously recorded on a plurality of recording sheets 61, and wasteful consumption of the recording sheets 61 can be prevented.

According to the embodiment described above, further, the initial placement area E1 is set in the position to have the rear end thereof to be apart from the rear end of the image readable area E3 for the length L5 rearward along the direction 8 of depth. In other words, the image readable area E3 is in the setback position with respect to the initial placement area E1 and the discharge area E2 along the direction 8 of depth; therefore, when the original sheet 62 is set on the image readable area E3, an amount of the part of the original sheet 62 hanging down along the front face 14 of the chassis 13 may be reduced. Accordingly, a front part of the recording sheet 61 may be exposed to be easily observed by the user.

According to the embodiment described above, further, the crosswise dimension L2 of the image readable area E3 is greater than the dimension L1 of depth of the image readable area E3 along the front-rear direction 8 (L2>L1). Therefore, the exposed part of the recording sheet 61 not covered by the original sheet 62 appears along the shorter edge of the recording sheet 61, which is in the size A4 in the above embodiment. This arrangement of the exposed part of the recording sheet 61 and the original sheet 62 may allow the user to inspect the condition of the recorded image. For example, the user may inspect whether the image is recorded in a correct position and an angle with respect to the recording sheet 61 or whether a margin in the recording sheet 61, ranging from the shorter edge of the recording sheet 61 to the image, is correctly reserved. For another example, when the image recorded on the recording sheet 61 is a document including horizontally-written sentences, an area in the vicinity of the shorter edge of the recording sheet 61 often includes a header and/or a title of the document. Therefore, the user may view the header and/or the title of the document appearing on the exposed part of the recording sheet 61 easily and may confirm that the user is not making a duplicate of a wrong document promptly.

According to the embodiment described above, further, with the crosswise dimension L2 being greater than the dimension L1 of depth of the image readable area E3 (L2>L1), and whilst the distance L4 between the leftward ends of the initial placement position E1 and the discharge area E2 along the crosswise direction 9 is greater than the distance L5 between the rear ends of the initial placement area E1 and the image readable area E3 between the direction 8 of depth, the space to be occupied by the printer unit 11 and the scanner unit 12 tends to be greater in the crosswise direction 9 than in the front-rear direction 8. Therefore, whilst the MFD 10 may be formed in a volume relatively larger along the crosswise direction 9, the MFD 10 can be formed in a smaller volume along the direction 8 of depth. Accordingly, MFD 10 may be arranged in a space with a limited depth such as in, for example, a shelf with a small depth.

According to the embodiment described above, further, the scanner unit 12 may be arranged in a displaced position with respect to the printer unit 11 along the crosswise direction 9. Therefore, the displaced space, in which the scanner unit 12 and the printer unit 11 do not vertically coincide with each other, may be effectively used to be occupied by the other components, such as a power source or the control circuit to control the printer unit 11 and the scanner unit 12. In other words, the entire MFD 10 may be downsized.

It is to be noted that features and acts of the MFD 10 may not necessarily be limited to those described above but may be modified within the scope of the present invention.

For example, the operation panel 16 may not necessarily be arranged in the position on the front face 14 of the chassis 13 to substantially coincide with the image readable area E3 along the crosswise direction 9 (in a side view), but the operation panel 16 may be arranged at least partially in a range indicated as R1 (see FIG. 7) on the front face 14. According to the latter arrangement, the user may not necessarily be required to flip the original sheet 62 upward to visually recognize the positions of the operation buttons 18 or to grope for the operation buttons 18 but may find the operation buttons 18 easily.

More Examples

The above-mentioned values concerning the dimensions L1-L5 are merely examples and may be varied as long as the varied dimensions should reasonably fall within the scope of the invention.

For another example, the operation panel 16 may not necessarily provided on the front face 14 of the chassis 13 but may be provided on the upper plane 42 in a frontward position with respect to the contact glass 41 along the front-rear direction 8.

For another example, the discharge tray 20 may not necessarily be formed in the extendable nest structure but may be formed to steadily protrude frontward from the front face of the chassis 13.

For another example, in the above-described embodiment, the sheet conveyer path 27 is formed to have the U-curved path 28 and the linear path 29. However, the sheet conveyer path 27 may further include an additional path, in which the recording sheet 61 with the image formed on one side is reversed, in order to have another image on the other side. That is, the printer unit 11 may be a double-face printable printer unit.

Second Embodiment

An MFD 100 according to a second embodiment of the present invention will be described with reference to FIGS. 8 through 15.

The MFD 100 includes an upper cover 110 and a main body chassis 150. The upper cover 110 is pivotable about an upper rear end of the main body chassis 150 to expose and cover an upper face of a scanner unit 160, which is arranged in an upper position in the main body chassis 150. The main body chassis 150 is provided with operation buttons 102 and an LCD panel 103, which function similarly to the operation buttons 18 and the LCD panel 17 in the MFD 10 described in the first embodiment. The upper cover 110 includes an ADF unit 115, which is disposed at a left side position in the upper cover 110. The ADF unit 115 is configured to feed a document sheet S along a predetermined document feeding path 125 to read an image appearing on a surface of the document sheet S.

The ADF unit 115 includes a document placement section 120, the document feeding path 125 (see FIG. 3), a document feeding mechanism 130, a driving motor M, and a transmission mechanism 140. The scanner unit 115 is configured to feed document sheets S placed on the document placement section 120 along the document feeding path 125.

The document placement section 120 is a substantially flat table formed in a crosswise central position inside the upper cover 110 and in a vertically central position. The document placement section 120 is configured such that the document sheets S to be fed by the ADF unit 15 are placed with the longitudinal direction thereof aligned with the crosswise direction 9 of the MFD 100 (i.e., in a state where shorter sides of the document sheets S align in parallel with the front-rear direction 8 of the MFP 110). The document placement section 120 is arranged at one end of the document feeding path 125.

In an upper position with respect to the document placement section 120, in a position to be spaced apart from the document placement section 120 for a predetermined height, a partition plate 121 is arranged. The partition plate 121 serves as a partition to cover an upper side of the document feeding mechanism 130 inside the ADF unit 115. The partition plate 121 is arranged at the other end of the document feeding path 125, which is the opposite end from the document placement section 120 across the document feeding path 125. On an upper surface of the partition plate 121, the document sheets S having been fed through the document feeding path 125 by the ADF unit 115 are stacked.

The document feeding path 125 is formed, inside the ADF unit 115, to extend along the crosswise direction 9 of the MFD 100 from the document placement section 120 continuously to the upper surface of the partition plate 21. The document feeding path 125 has a U-curved path 126. Moreover, the document feeding path 125 has a width (a dimension in the front-rear direction 9 of the MFD 100) corresponding to the shorter sides of the document sheets S. As described above, on the document placement section 120, the document sheets S are placed with the longer sides thereof aligned with the crosswise direction of the MFD 100. Further, the document sheets S are fed along the document feeding path 125, which extends along the crosswise direction of the MFD 100. Accordingly, the document sheets S are fed on and along the document feeding path 125 with the shorter sides thereof aligned with the front-rear direction 8 of the MFD 100.

At a leftward portion in the ADF unit 115, the U-curved path 126 is formed substantially in a shape of a "U" when viewed along the front-rear direction 8 of the MFD 100. The U-curved path 126 is configured to invert a sheet feeding direction of the document sheet S having been fed leftward from the document placement section 120 at 180 degrees and guide the document sheet S onto the upper surface of the partition plate 121 (see FIG. 3). Thus, the U-curved path 126 is disposed in a leftward position in the document feeding path 125 (on a left side with respect to a contact glass 161, which will be described later) inside the upper cover 110.

In the second embodiment, a sheet feeding direction of the document sheets S is defined as a course, on which the document sheets S are guided from the surface of the document placement section 120 to the partition plate 121 along the document feeding path 125. The width of the document feeding path 125 corresponds to the shorter sides of the document sheets S and is substantially as long as, or slightly longer than, the dimension of the shorter sides of the document sheets S so as to enable smooth conveyance of the document sheets S.

As shown in FIGS. 10 and 11, the document feeding mechanism 130 is configured to feed the document sheets S placed on the document placement section 120 toward a downstream side of the document feeding path 125 in the sheet feeding direction by a driving force generated in the driving motor M and transmitted through the transmission mechanism 140.

The document feeding mechanism 130 includes a document pickup roller 131, a document contact member 131A, a document separator roller 132, a separator pad 133, document feed rollers 134, a main roller 135, a first driven roller 136, and a second driven roller 137. The document pickup roller 131 is rotatably arranged in a downstream position with respect to the sheet placement section 120 along the sheet feeding direction to face a lower side of the document sheet S being fed in the document feeding path 125. When driven by the driving motor M, the document pickup roller 131 is rotated and feeds the document sheets S placed on the document placement section 120 in the sheet feeding direction toward the downstream end (i.e., to the partition plate 121).

The document contact member 131A is swingably provided in a position to face the document pickup roller 131 across the document feeding path 125 and to contact an upper side of the document sheet S lying on the document pickup roller 131. The document contact member 131A is configured to press the document sheet S placed on the document placement section 120 against the document pickup roller 131. Further, the document contact member 131A has a function to manage the document sheet S to be smoothly separated from other document sheets S on the sheet placement section 120.

The document separator roller 132 is rotatably arranged in a downstream position with respect to the document pickup roller 131 along the sheet feeding direction to face the lower side of the document sheet S being fed in the document feeding path 125. When driven by the driving motor M, the document separator roller 132 is rotated to separate a single document sheet S from the other document sheets S in cooperation with the separator pad 133 and feeds the separated document sheets S in the sheet feeding direction toward the downstream end (i.e., to the partition plate 121).

In a position between the document separator roller 132 and the document pickup roller 131, a mechanism (not shown) to transmit to the driving force, which is transmitted to the document pickup roller 131, to the document separation roller 32, is provided. Thus, the driving force from the driving motor M is transmitted to the document pickup roller 31 through the document separator roller 132 and through the transmission mechanism.

The separator pad 133 is a thin plate member made of a material having a predetermined level of flexibility and a predetermined degree of frictional resistance. The separator pad 133 is disposed in a position to face the document separator roller 32 across the document feeding path 125 at a downstream side with respect to the document contact member 131A along the sheet feeding direction. The separator pad 133 is disposed to contact an upper side of the document sheet S lying on the document separator roller 132. The separator pad 133 is configured to apply a frictional force to the document sheet S and separate the document sheet S from other document sheets S on a sheet-by-sheet basis in cooperation with the document separator roller 132.

The document feed rollers 134 are rotatably arranged to face each other across the document feeding path 125 in positions on a downstream side with respect to the document separator roller 132 and the separator pad 133 along the sheet feeding direction. One of the document feed rollers 134 disposed at an upper position with respect to the document feeding path 125 is driven to rotate by the driving force from the driving motor M. The other of the document feed rollers 134 disposed at a lower position with respect to the document feeding path 125 is driven by rotation of the upper roller 134. The document feed rollers 134 are configured to feed the document sheet S, separated by the document separator roller 132 and the separator pad 133 from other document sheets S on a sheet-by-sheet basis, toward the downstream along the feeding direction in the document feeding path 125 by rotating while pinching the separated document sheet S therebetween.

The main roller 135 is rotatably arranged in a position to fit along curvature of the U-curved path 126 that forms the document feeding path 125. The main roller 135 is driven to rotate by the driving motor M. Further, an outer circumferential surface of the main roller 135 forms a part of the U-curved path 126 together with a guide surface 126A, which faces the main roller 135. When the main roller 135 rotates, the document sheet S fed by the document feeding rollers 134 is conveyed along the U-curved path 126.

The first driven roller 136 is rotatably arranged in a lower position with respect to the main roller 135 and in a position to face the main roller 135 across the document feeding path 25 (the U-curved path 126). The first driven roller 136 is driven by rotation of the main roller 135. Further, the second driven roller 137 is rotatably arranged in an upper position with respect to the main roller 135 and in a position to face the main roller 135 across the document feeding path 125 (the U-curved path 126). The second driven roller 137 is driven by rotation of the main roller 135. Accordingly, the document sheet S is conveyed along the U-curved path 126 by rotation of the main roller 135 and the first and second driven rollers 136 and 137.

The driving motor M is a driving source for feeding the document sheet S in the ADF unit 15. The driving motor M is driven under control of a controller (not shown). As shown in FIGS. 9-11 and 13, the driving motor M is disposed to protrude partially downwardly toward the main body chassis 150 from a bottom level of the upper cover 110. In other words, the driving motor M is not necessarily accommodated entirely in the upper cover 110 at least in the vertical direction. Therefore, the upper cover 110 can be formed to have a smaller height, and height of the MFD 100 may be reduced to be smaller compared to an MFD, of which driving motor is fully accommodated inside the upper cover 110 (or in the ADF unit 115).

As shown in FIGS. 9-13 and 15, the driving motor M is disposed in a leftward position with respect to the U-curved path 126 (e.g., in a leftmost position on the document feeding path 125) across the guide surface 126A along the crosswise direction 9 of the MFD 100. Further, the driving motor M is disposed in a rearward position in the MFD 100 but within a range of the width of the document feeding path 125, which extends along the front-rear direction 8 of the MFD 100 (see FIGS. 11 and 12). Therefore, the upper cover 110 can be formed to have a smaller dimension in the front-rear direction 8, and dimension of the MFD 100 may be reduced in the front-rear direction 8 to be smaller compared to an MFD, of which driving motor is arranged in a rearward position and outside with respect to the widthwise range of the document feeding path 125. Even in this arrangement with the upper cover 110 downsized in the front-rear direction 8, behaviors of the document sheet S being conveyed in the document feeding path 125 are maintained unaffected from possible inconvenience, which could be caused by the size-reduction while the driving motor M is disposed in the leftward and outer-side position with respect to the U-curved path 126.

The transmission mechanism 140 is configured to transmit the driving force from the driving motor M to the document feeding mechanism 130. The transmission mechanism 140 includes a first gear train 141, a second gear train 142, and a transmission gear 143 (see FIGS. 11 and 12). The first gear train 141 is connected with a driving shaft (unsigned) that extends from the driving motor M toward the rear of the upper cover 110. The first gear train 141 includes a plurality of gears arranged in a row along the crosswise direction of the MFD 100. The first gear train 141, which includes a gear attached to a rotational shaft of the main roller 135, transmits the driving force from the driving motor M to the main roller 135.

The second gear train 142, which includes a plurality of gears arranged in a row along the crosswise direction of the MFD 100, is disposed on a rear side of the document feeding path 125 (see FIGS. 11 and 12). Namely, the second gear train 142 is provided to extend in the crosswise direction, in a rearward position with respect to the first gear train 141 to be spaced apart from the first gear train 141 along the front-rear direction 8 of the MFD 100. The second gear train 142 includes a gear, which is attached to a rotational shaft of the upper roller of the document feed rollers 134 and to a rotational shaft of the document separator roller 132. Thereby, the second gear train 142 transmits the driving force from the driving motor M to the document feed rollers 134 and to the document separator roller 132.

The transmission gear 143 is formed to have a depth (dimension in the front-rear direction 8), which is equivalent to a distance between the first gear train 141 and the second gear train 142 along the front-rear direction 8 of the MFD 100. The transmission gear 143 is rotatably arranged in a position to contact both a rightmost gear in the first gear train 141 and a leftmost gear in the second gear train 142. By the contact, the driving force from the driving motor M is transmitted to the second gear train 142 via the first gear train 141 and the transmission gear 43.

Namely, even in the arrangement, in which the driving motor M is disposed outside the U-curved path 26 along the crosswise direction 9 of the MFD 100 and within the widthwise range of the document feeding path 125 along the front-rear direction 8 of the MFD 100, the driving force from the driving motor M is transmitted to the document feeding mechanism 130 by utilizing a limited space while the dimension of the upper cover 110 in the front-rear direction 8 is prevented from being increased.

Subsequently, a configuration of the main body chassis 150 will be described with reference to the relevant drawings. As shown in FIG. 8, the main body chassis 150 contains the scanner unit 160 and the printer unit 170, which are similar to the scanner unit 12 and the printer unit 11 respectively in the MFD 1 described in the first embodiment. The scanner unit 160 includes a contact glass 161, an image sensor 162, a slide shaft (unsigned), and a motor (unsigned). The contact glass 161 is a so-called "platen glass" and formed in a rectangular shape having a size slightly larger than the A4 size. The contact glass 161 is arranged on top of the main body chassis 151 with its longer edges (longitudinal sides) aligned with the crosswise direction 9 of the main body chassis 150.

The image sensor 162 is a line sensor employing a contact image sensor (CIS) configured to read images in a reading range, which is equivalent to the dimension of the shorter edges of the A4 size, along the main scanning direction (i.e., the front-rear direction 8 of the main body chassis 150). The image sensor 162 is held by a slide shaft extending in the crosswise direction 9 of the main body chassis 150 to be slidably movable within a predetermined slidable range (e.g., a range equivalent to the longer dimension of the A4 size) in the crosswise direction 9. Thus, the MFD 100 is allowed to read the image appearing on the document sheet S, which is placed on the contact glass 161, while the image sensor 162 is slidably moved in the sliceable range under control of the controller of the scanner unit 160.

On the upper face of the main body chassis 150, there is a recessed portion 165 to form a downward-recessed shape at a position corresponding to the position where the driving motor M is provided in the upper cover 110 (see FIGS. 9-13). The recessed portion 165 is formed to accommodate a part of the driving motor M that protrudes downward out of the upper cover 110 in the state where the upper cover 110 is closed. Thus, owing to the above configuration regarding the recessed portion 165 and the position of the driving motor M in the upper cover 110, the MFD 100 can be downsized in the vertical direction.

There is a hinge member 190 provided at two rear-end positions of the upper face of the main body chassis 150. The hinge member 90 is rotatably supported by a rotational shaft 191 to be rotatable about the rear end of the upper cover 110 (see FIGS. 12, 14A, and 14B). Namely, the hinge member 190 supports the upper cover 110 via the rotational shaft 191 to be openable and closeable with respect to the upper face of the main body chassis 150 (see FIGS. 8-13). As shown in FIGS. 14A and 14B, the hinge member 190 is movable along a rear end of the contact glass 161 in the vertical direction. Even when at a lowermost level, the hinge member 190 keeps the rotational shaft 191 higher than the upper face of the main body chassis 150 (i.e., higher than the upper surface of the contact glass 161) (see FIG. 14A). Thereby, even though the hinge member 190 is arranged in the position along the rear end of the contact glass 161, the MFD 100 can be downsized in the front-rear direction 8 without interfering with opening or closing behaviors of the upper cover 110.

As shown in FIG. 12, a left-side portion of the hinge member 90 is disposed at a rearward corner with respect to the driving motor M and the first gear train 141. Namely, in the MFD 100, the corner which is otherwise a vacant space is efficiently utilized for (the left-side portion of) the hinge member 190, and thus the MFD 100 can be downsized in the front-rear direction 8.

Subsequently, a configuration of the printer unit 170 will be described with reference to the relevant drawings. The printer unit 170 forms images on the recording sheets P while the recording sheets P are conveyed from a sheet cassette 105 through the printer unit 170 and includes a recording unit 175, a sheet conveyer path 180, and a sheet conveyer unit 185. In the sheet cassette 105, the recording sheets P are placed with the longer edges (the longitudinal sides) thereof aligned with the crosswise direction 9 of the MFD 100. The recording sheets P are fed, by the sheet conveyer unit 185, on the sheet conveyer path 180 extending along the front-rear direction 8 of the MFD 100. Thus, when image formation is carried out by the printer unit 170, each recording sheet P is conveyed with one of the longer edges thereof as a leading edge.

As shown in FIG. 16, the recording unit 175 is configured similarly to the recording unit 31 in the MFD 1 described in the first embodiment and includes a recording head 176, a platen 177, a carriage 178, which behave similarly to the recording head 33, the platen 32, and the carriage 35 in the recording unit 31. With the recording unit 175, the image is formed in ink on the recording sheet P while the recording sheet P is conveyed in the sheet conveyer path 180.

The sheet conveyer path 180 is formed along the front-rear direction 8 of the MFD 100 inside the printer unit 170 and includes a first conveyer path 181 and a second conveyer path 182 (see FIG. 16). The first conveyer path 181 includes an inner guide member 181A and an outer guide member 181B that are formed in arc shapes in cross-section and face each other along a radial direction of the arcs. The first conveyer path 181 is thus formed in an arc in the cross section to extend from one end, which is located above a rear end of the sheet cassette 105, upwardly to the other end, which is located in a rearward position with respect to the platen 177.

The second conveyer path 182 is formed to have a linear cross-section extending from a downstream end of the first conveyer path 181 along a sheet conveying direction of the recording sheet P toward a sheet dischargeable space 106 via a pathway between the recording head 176 and the platen 177. An upper surface of the platen 177 forms a part of a lower guide surface of the second conveyer path 182. Therefore, the recording sheet P fed out of the sheet cassette 105 reaches the recording unit 175 along the first and second conveyer paths 181 and 182, passes through the second conveyer path 182, and is thereafter discharged in the sheet dischargeable space 106. In this regard, when the recording sheet P is greater than a predetermined size, specifically when the length of the shorter edges of the recording sheet P is greater than a length between the discharge rollers 188 and the front face of the main body chassis 150, the recording sheet P may protrude out of the sheet dischargeable space 106 through an opening (see FIG. 8) formed in the main body chassis 150.

The sheet conveyer unit 185 includes a feed roller 186, conveyer rollers 187, and discharge rollers 188, which behave similarly to the feed roller 25, the conveyer rollers 30, and the discharge rollers 34 respectively in the printer unit 11 described in the first embodiment, to feed the recording sheets P placed in the sheet cassette 105 along the sheet conveyer path 180.

The feed roller 186 includes an arm 186A, a gear train 186B, and a supporting shaft 186C. When a driving force is transmitted to the supporting shaft 186C, the feed roller 186 is rotated by the driving force transmitted via the gear train 186B disposed inside the arm 186A. The feed roller 186 is configured to be in contact with the recording sheet P and feed the recording sheet P onto the sheet conveyer path 180 while the feed roller 186 is rotated by the driving force transmitted via the gear train 186B.

The recording sheet P fed by the feed roller 186 is conveyed by the conveyer rollers 187 in the sheet conveyer path 180 and discharged into the sheet dischargeable space 106 by the discharge rollers 188.

As described above, the recording sheet P is initially placed in the sheet cassette 105 in the state where the shorter edges thereof aligned with the front-rear direction 8 of the MFD 100. The recording sheet P picked up from the sheet cassette 105 is conveyed in the sheet conveyer path 180 along the arc shape in the first conveyer path 181 to be turned over and linearly in the second conveyer path 182. Further, the recording sheet P is released in the sheet dischargeable space 106. In this regard, the second conveyer path 182 and the sheet dischargeable space 106 substantially coincide with the sheet cassette 105 vertically. Therefore, while the recording sheet P is conveyed from the sheet cassette 105 to the sheet dischargeable space 106, the recording sheet P is not displaced in the crosswise direction 9 but stays within the same crosswise range. In other words, an initial placement area, which is occupied by the recording sheet P in a maximum usable size placed in the sheet cassette 105 (indicated by a fine dotted line P in FIG. 15), coincides with a discharge area, which is occupied by the maximum-usable sized recording sheet P discharged in the sheet dischargeable space 106, with regard to the crosswise range along the crosswise direction 9.

According to the above-described configuration, the MFD 100 has an image readable area, which is nearly equivalent to the size of the contact glass 161 (indicated by a solid line 161 in FIG. 15), and which can be scanned by the image sensor 162 to read an image. In this regard, the initial placement area and the discharge area are displaced from the position of the image readable area 161 for a leftward length L4' along the crosswise direction 9. Therefore, even when a user makes a copy of the image appearing on an original sheet, which is larger than the image readable area (i.e., the size of the contact glass 161), the left-side part corresponding to the length L4' of the recording sheet P protruding out of the sheet dischargeable space 106 can be exposed to be seen from the user. Therefore, the user can inspect a condition of the image recorded on the recording sheet P based on the image appearing on the exposed part.

Further, with the sheet conveyer path 180 being formed to have the substantially equivalent dimension to the dimension of the shorter edges of the recording sheet P, the MFD 100 can be downsized in the front-rear direction 9 of the MFD 100 compared to an MFD, in which the sheet cassette accommodates the recording sheet P with its longer edges aligned with the front-rear direction 9.

Further, as shown in FIG. 15, in the ADF unit 115, the document sheet S is placed on the document placement section 120 in the state where the shorter edges thereof aligned with the front-rear direction 8 of the MFD 100. Meanwhile, in the main body chassis 150, the recording sheet P is placed in the sheet cassette 105 in the state where the shorter edges thereof aligned with the front-rear direction 8 of the MFD 100. Hence, the ADF unit 115 and/or the main body chassis 150 in the MFD 100 may be downsized in the front-rear direction 8. Therefore, the MFD 100 as a whole may be downsized in the front-rear direction 8.

As described above, the MFD 100 of the present embodiment includes the upper cover 110 that has the ADF unit 115, and the main body chassis 150 that has the scanner unit 160 and the printer unit 170. The ADF unit 115 includes the document feeding path 125, the document feeding mechanism 130, and the driving motor M. The ADF unit 115 is configured to feed the document sheet S along the document feeding path 125 so as to enable the scanner unit 160 to read an image of the document sheet S. The document feeding path 125 has a width corresponding to the dimension of the shorter edges of the document sheet S and extends along the crosswise direction 9 of the MFD 100. The document feeding path 125 includes the U-curved path 126 for inverting the feeding direction of the document sheet S. The U-curved path 126 is arranged on the left side in the upper cover 110 (at the leftward end of the document feeding path 125). The document feeding mechanism 130 is configured to feed the document sheet S on the document feeding path 125 such that the longer edges of the document sheet S aligned with the crosswise direction 9 of the MFD 100. The driving motor M is disposed within the range corresponding to the width of the document feeding path 125 in the front-rear direction 8 of the MFD 100 at the leftward position with respect to the U-curved path 126 along the crosswise direction 9 of the MFD 100. The driving motor M is configured to provide the driving force to the document feeding mechanism 130. With this arrangement, the external dimension of the MFD 100 may be reduced in the front-rear direction 8 as small as nearly to the width of the document feeding path 125 (see FIGS. 12 and 15), Further, the main body chassis 150 includes the sheet cassette 105 configured to accommodate the recording sheets P with the longer edges thereof aligned with the crosswise direction 9 of the MFD 100, and the printer unit 170 configured to form images on the recording sheets P while the recording sheets P are being conveyed. Since the sheet cassette 105 is configured to accommodate the recording sheets P with the longer edges thereof aligned with the crosswise direction 9, the external dimension of the MFD 100 may be reduced in the crosswise direction 9.

The driving motor M is disposed to partially protrude downward from the lower surface of the upper cover 110 which includes the ADF unit 115 (see FIGS. 9 and 10). Further, the main body chassis 150 has the contact glass 161, the scanner unit 160 including the image sensor 162, and the recessed portion 165 provided on the upper face thereof. The recessed portion 165 is formed at a position, on the upper face of the main body chassis 150, which corresponds to the position of the lower surface of the upper cover 110 where the driving motor M is disposed. The recessed portion 165 accommodates the part of the driving motor M that protrudes from the lower surface of the upper cover 110. Thus, since the recessed portion 165 formed on the upper face of the main body chassis 150 accommodates the part of the driving motor M, the MFD 100 may be downsized in the vertical direction.

Further, the printer unit 170 feeds the recording sheets P, placed in the sheet cassette 105 with their longer edges aligned with the crosswise direction 9 of the MFD 100, along the front-rear direction 8 of the MFD 100 perpendicular to the feeding direction (the crosswise direction 8) in which the ADF unit 115 feeds the document sheets S. Thereby, it is possible to reduce the length of the sheet conveyer path 180 for the recording sheets P in the printer unit 170 to be as long as the shorter edges of the recording sheets P. Thus, the MFD 100 may be downsized in the front-rear direction 8.

The ADF unit 115 has the transmission mechanism 140 that includes the first gear train 141, the second gear train 142, and the transmission gear 143. The first gear train 141 extends in the crosswise direction 9 of the MFD 100 along the document feeding path 125. The first gear train 141 transmits the driving force from the driving motor M to the document feeding mechanism 130. The second gear train 142 is disposed in a different position from the first gear train 141 in the front-rear direction 8 of the MFD 100 and extends along the crosswise direction 8 of the MFD 100 from the driving shaft of the driving motor M. The second gear train 142 transmits the driving force from the driving motor M. The transmission gear 143 has a thickness which is equivalent to the distance between the first gear train 141 and the second gear train 142 in the front-rear direction 8 of the MFD 100. The transmission gear 143 contacts a gear disposed at an end of the first gear train 141 and a gear disposed at an end of the second gear train 142. Accordingly, the driving force from the driving motor M is transmitted to the document feeding mechanism 130 via the first gear train 141, the transmission gear 143, and the second gear train 142. Thus, even when the driving motor M is disposed within the range equivalent to the width of the document feeding path 125 in the front-rear direction 8 of the MFD 100, at the leftward position with respect to the U-curved path 126 along the crosswise direction 9 of the MFD 100, the MFD 100 transmits the driving force from the driving motor M to the document feeding mechanism 130 by utilizing a limited space while the dimension of the upper cover 110 in the front-rear direction 8 is prevented from being increased (see FIGS. 11 and 12).

Further, the upper cover 110 is rotatably supported by the hinge member 190 to be openable and closeable between a closed position (see FIGS. 8 to 10), wherein the upper cover 110 covers the upper face of the main body chassis 150, and an open position (see FIG. 13), wherein the upper face of the main body chassis 50 is exposed. The left-side portion of the hinge member 90 is disposed at the corner of the upper face of the main body chassis 150 where the driving motor M and the first gear train 141 are disposed to be adjacent to each other (see FIG. 12). Hence, according to the MFD 100, it is possible to efficiently utilize the corner of the upper face of the main body chassis 150 where the driving motor M and the first gear train 141 are disposed to be adjacent to each other. Thus, it is possible to downsize (the external dimension of) the MFD 100 in the front-rear direction 8.

The hinge member 190 includes (supports) the rotational shaft 191 that supports the upper cover 110 to be openable and closeable. Further, the hinge member 190 is provided to be movable within a predetermined range along the rear end of the contact glass 161 in the vertical direction (see FIGS. 14A and 14B). Even when the hinge member 190 is at the lowermost level, the rotational shaft 191 is kept in a position higher than the level of the upper face of the main body chassis 150 (see FIG. 14A). Thereby, even when the hinge member 190 is provided along the rear end of the contact glass 161, it is possible to downsize (the external dimension of) the MFD 100 in the front-rear direction 8 without exerting an undesired influence on the turning motion of the upper cover 110. The second embodiment has been described based on an assumption that the direction parallel to the shorter edges of the document sheet S corresponds to the main scanning direction of the image sensor 162 and the direction parallel to the longer edges of the document sheet S corresponds to the sub-scanning direction of the image sensor 162. However, when the document sheet S is in a smaller size and the longer edges of the smaller-sized document sheet S are equal to or less than the length of the readable range of the image sensor 162 in the main scanning direction, image reading may be carried out for the smaller-sized document sheet S being fed with the longer edges thereof aligned with the sub scanning direction.

Although examples of carrying out the invention have been described, those skilled in the art will appreciate that there are numerous variations and permutations of the multifunction device that falls within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, the crosswise direction 9 and the front-rear direction 8 of the MFD 100 in the aforementioned embodiments may be defined in an interchanged manner.

For another example, in the aforementioned embodiments, the printer unit 11, 170 is configured to form an image on the recording sheet in an inkjet method to discharge ink droplets from the recording head 33, 176. However, the printer unit 11, 170 may employ another image forming method using toner as far as the method is adapted to perform image formation while feeding the recording sheet.

What is claimed is:

1. A multifunction device configured to read an image and record an image on a recording sheet, comprising:
    an image recording unit configured to record the image on the recording sheet;
    a flatbed-type scanner unit arranged above the image recording unit and configured to read the image from an original sheet, the scanner unit comprising an image readable plane which supports the original sheet with the image to be read; and
    an auto document feeder unit configured to feed a document sheet to be read by an image reader,
    wherein the image recording unit is disposed in a main body unit, which is arranged below the auto document feeder unit,
    wherein the image recording unit comprises:
        a first tray configured to store the recording sheet on which the image is to be recorded;
        a conveyer path configured to convey the recording sheet stored by the first tray upwardly from a rear side of the multifunction device, to invert the conveyed recording sheet, and to further convey the inverted recording sheet in a first direction toward a front face of the multifunction device; and
        a second tray, which is formed along an edge of an opening formed on the front face of the multifunction device, and to which the recording sheet having been conveyed in the conveyer path is to be conveyed,
    wherein the auto document feeder unit comprises:
        a sheet feeding path formed to define a sheet feeding direction of the document sheet and including a U-curved path, the sheet feeding direction of the sheet feeding path being turned, at the U-curved path, to a second direction, which is perpendicular to the first direction in a horizontal plane view, from a third direction, which is substantially parallel and opposite to the second direction;
        a sheet feeding unit configured to convey the document sheet along the sheet feeding path; and
        a driving motor arranged within a range corresponding to a width of the sheet feeding path along the first direction and configured to provide a driving force to the sheet feeding unit,
    wherein a discharge area of the second tray is configured to accommodate recording sheets of one or more specified sizes,
    wherein, in a third direction parallel and opposite to the second direction, a downstream end of the discharge area is displaced from and downstream of a downstream end of an image readable area of the image readable plane, the downstream end of the discharge area in the third direction being displaced from the downstream end of the image readable area in the third direction at a first distance,
    wherein the driving motor is arranged to partially protrude downwardly from a lower surface of the auto document feeder unit,
    wherein the main body unit comprises:
        the image readable plane included in the scanner unit, the image readable plane being arranged on an upper face of the main body unit;
        the image reader arranged in a lower position with respect to the image readable plane and configured to read the image from the original sheet placed on the image readable plane; and
        a recessed portion formed on the upper face of the main body unit in a position corresponding to a position of the driving motor, the recessed portion being capable of accommodating a protruded part of the driving motor, the protruded part of the driving motor protruding downwardly from the lower surface of the auto document feeder unit, and
    wherein, in the third direction, the recessed portion is formed downstream of the downstream end of the image readable area of the image readable plane.

2. The multifunction device according to claim 1,
    wherein the first tray has a placement area, configured to support a recording sheet of one of the one or more specified sizes when the recording sheet of the one of the one or more specified sizes is placed in the first tray, and
    wherein a rear end of the placement area in the first direction is displaced by a second distance toward the front face of the multifunction device from a corresponding end of the image readable area in the first direction, the second distance being smaller than the first distance.

3. The multifunction device according to claim 2,
    wherein the placement area is entirely upstream of the front face of the multifunction device along a fourth direction.

4. The multifunction device according to claim 2,
    wherein dimensions of the image readable area along the first direction and along the second direction are equivalent to dimensions of the placement area along the first direction and the second direction, respectively; and
    wherein the dimension of the image readable area and the placement area along the second direction is greater than the dimension of the image readable area and the placement area along the first direction.

5. The multifunction device according to claim 1,
wherein an operation panel, configured to manipulate operation of the scanner unit and the image recording unit, is arranged in a downstream position with respect to the image readable plane along the first direction; and
wherein a range occupied by the operation panel along the second direction at least partially coincides with a range between the downstream end of the discharge area along the third direction and the downstream end of the image readable area in the third direction.

6. The multifunction device according to claim 1,
wherein the scanner unit includes an image sensor, which is configured to move in a direction parallel with the second direction and to read the image from the original sheet placed on the image readable plane while being moved.

7. The multifunction device according to claim 1,
wherein the second tray is at least partially extended from the opening formed on the front face of the multifunction device, and
wherein the second tray is movable between a usable posture, in which at least a part of the second tray is extended outwardly from the opening in the front face of the multifunction device, and a nested posture, in which the second tray is entirely stored in an upstream position with respect to the opening along the first direction.

8. The multifunction device according to claim 1,
wherein the driving motor is arranged downstream of the U-curved path in the third direction.

9. The multifunction device according to claim 1,
wherein the auto document feeder unit comprises:
a first gear train extending in parallel with the second direction along the sheet feeding path, the first gear train being configured to transmit the driving force from the driving motor to the sheet feeding unit;
a second gear train extending in parallel with the second direction from a driving shaft of the driving motor, in a position different from a position of the first gear train in the first direction, the second gear train being configured to transmit the driving force from the driving motor to the sheet feeding unit; and
a transmission gear having a thickness corresponding to a distance between the first gear train and the second gear train along the first direction, the transmission gear being arranged to contact a gear disposed at an end of the first gear train and a gear disposed at an end of the second gear train.

10. The multifunction device according to claim 9, further comprising:
a hinge member configured to rotatably support the auto document feeder unit to be openable and closable with respect to the main body unit between a closed position, in which the auto document feeder unit covers the upper face of the main body unit, and an open position, in which the upper face of the main body unit is exposed,
wherein the hinge member is disposed at a corner of the upper face of the main body unit in which the driving motor and the first gear train are arranged to be adjacent to each other.

11. The multifunction device according to claim 10,
wherein the hinge member comprises a rotational shaft configured to support the auto document feeder unit to be openable and closable and is vertically movable in a position along an edge of the image readable area within a predetermined range; and
wherein the rotational shaft is maintained in a position higher than the upper face of the main body unit even when the hinge member is in a lowermost level within the predetermined range.

\* \* \* \* \*